US009784414B2

(12) United States Patent
Bao et al.

(10) Patent No.: US 9,784,414 B2
(45) Date of Patent: *Oct. 10, 2017

(54) DRAG REDUCTION OF ASPHALTENIC CRUDE OILS

(75) Inventors: Zhiyi Bao, Greenwood, IN (US); Stuart N. Milligan, Ponca City, OK (US); Michael Olechnowicz, Ponca City, OK (US); Ray L. Johnston, Ponca City, OK (US); Timothy L. Burden, Ponca City, OK (US); Kenneth W. Smith, Tonkawa, OK (US); William F. Harris, Palm Harbor, FL (US); Wayne R. Dreher, Jackson, TN (US)

(73) Assignee: LIQUIDPOWER SPECIALTY PRODUCTS, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,119

(22) Filed: Aug. 12, 2011

(65) Prior Publication Data

US 2012/0000544 A1   Jan. 5, 2012

Related U.S. Application Data

(63) Continuation-in-part of application No. 11/615,539, filed on Dec. 22, 2006, now Pat. No. 8,022,118, and a continuation-in-part of application No. 13/208,951, filed on Aug. 12, 2011.

(51) Int. Cl.
| | |
|---|---|
| *C09K 3/00* | (2006.01) |
| *F17D 1/17* | (2006.01) |
| *C10G 75/04* | (2006.01) |
| *F17D 1/16* | (2006.01) |

(52) U.S. Cl.
CPC .............. *F17D 1/17* (2013.01); *C09K 3/00* (2013.01); *C10G 75/04* (2013.01); *F17D 1/16* (2013.01); *C10G 2300/206* (2013.01); *C10G 2300/308* (2013.01); *Y10T 137/0391* (2015.04)

(58) Field of Classification Search
USPC .......... 526/328.5; 523/175, 149; 208/22, 23, 208/39, 44, 298; 406/46, 47, 48; 507/103, 117, 118, 119, 120, 121, 203, 507/219, 221, 224, 225, 226, 935; 524/59, 62, 64, 67, 543, 556
See application file for complete search history.

(56) References Cited

U.S. PATENT DOCUMENTS

| | | | |
|---|---|---|---|
| 3,493,000 A | 2/1970 | Canevari et al. | |
| 3,554,897 A * | 1/1971 | Stanley | 208/48 AA |
| 3,654,994 A * | 4/1972 | Slagel | C09K 3/00 137/13 |
| 3,661,541 A | 5/1972 | Hollyday, Jr. | |
| 3,679,582 A | 7/1972 | Wagenaar et al. | |
| 3,726,653 A | 4/1973 | van der Meij et al. | |
| 3,736,288 A | 5/1973 | Stratta et al. | |
| 3,748,266 A | 7/1973 | Malone et al. | |
| 3,758,406 A * | 9/1973 | Malone | C09K 3/00 137/13 |
| 3,857,402 A | 12/1974 | Schuh | |
| 3,865,124 A | 2/1975 | Kohler et al. | |
| 4,068,676 A | 1/1978 | Thorn et al. | |
| 4,190,069 A | 2/1980 | Krantz | |
| 4,212,312 A | 7/1980 | Titus | |
| 4,358,572 A | 11/1982 | Mack et al. | |
| 4,527,581 A * | 7/1985 | Motier | C08F 210/08 137/13 |
| 4,573,488 A | 3/1986 | Carville et al. | |
| 4,736,005 A * | 4/1988 | Castner | C08F 220/56 507/225 |
| 4,769,160 A | 9/1988 | Karydas | |
| 4,876,018 A | 10/1989 | Karydas | |
| 4,881,566 A | 11/1989 | Ubels et al. | |
| 4,983,186 A * | 1/1991 | Naiman | C09K 3/00 137/13 |
| 4,997,580 A | 3/1991 | Karydas et al. | |
| 5,021,526 A | 6/1991 | Ball | |
| 5,039,432 A | 8/1991 | Ritter et al. | |
| 5,080,121 A * | 1/1992 | Malik | C08F 220/18 137/13 |

(Continued)

FOREIGN PATENT DOCUMENTS

| | | |
|---|---|---|
| EP | 0555054 A1 | 8/1993 |
| EP | 0882739 | * 12/1998 |

(Continued)

OTHER PUBLICATIONS

Eslami, Journal of Polymer Science Part A: Polymer Chemistry, vol. 44, issue 6, p. 1914-1925 (2006).*
O. Strausz and E. Lown, The Chemistry of Alberta Oil Sands, Bitumens and Heavy Oils, Albert Energy Research Institute (2003), pp. 464-480.
A.F.M. Barton Ph.D., "CRC Handbook of Solubility Parameters and Other Cohesion Parameters", CRC Press Inc., 2nd Ed. (1991).
John Burke, "Solubility Parameters: Theory and Application", The Book and Paper Group Annual, vol. 3 (1984), The American Institute for Conservation, pp. 1-35.
Hyoung J. Choi et al., "Polymer-Induced Turbulent Drag Reduction", Ind. Eng. Chem. Res. 1996, 35, pp. 2993-2998.
M.B. Dusseault, "Comparing Venezuelan and Canadian Heaving Oil and Tar Sands", Canadian International Petroleum Conference, Paper 2001-061, (2001), pp. 1-20.
R.F. Fedors, "A Method for Estimating Both the Solubility Parameters and Molar Volumes of Liquids", Polymer Eng. & Sci., vol. 14, No. 2, (Feb. 1974).

(Continued)

*Primary Examiner* — Robert C Boyle
(74) *Attorney, Agent, or Firm* — Patterson & Sheridan, LLP

(57) ABSTRACT

A process for preparing a drag reducing polymer which is to be added to a liquid hydrocarbon. The liquid hydrocarbon has an asphaltene content of at least about 3 weight percent and an API gravity of less than about 26°. The drag reducing polymer can comprise the residues of a monomer having at least one heteroatom. Treatment of the liquid hydrocarbon with the drag reducing polymer allows a reduction in pressure drop associated with turbulent flow of the liquid hydrocarbon through a conduit.

23 Claims, 4 Drawing Sheets

(56) References Cited

U.S. PATENT DOCUMENTS

| | | | |
|---|---|---|---|
| 5,110,874 A | 5/1992 | Naiman et al. | |
| 5,159,035 A | 10/1992 | Evani | |
| 5,244,937 A | 9/1993 | Lee et al. | |
| 5,269,909 A | 12/1993 | Ovalles et al. | |
| 5,374,350 A | 12/1994 | Heck et al. | |
| 5,504,132 A * | 4/1996 | Smith | C08F 10/00 524/401 |
| 5,539,044 A | 7/1996 | Dindi et al. | |
| 5,980,730 A | 11/1999 | Morel et al. | |
| 6,007,702 A | 12/1999 | Schievelbein | |
| 6,015,779 A * | 1/2000 | Eaton | C08F 10/00 208/14 |
| 6,178,980 B1 | 1/2001 | Storm | |
| 6,218,490 B1 | 4/2001 | Brunelli et al. | |
| 6,524,469 B1 | 2/2003 | Schucker | |
| 6,576,732 B1 | 6/2003 | Smith et al. | |
| 6,730,750 B2 | 5/2004 | Eaton et al. | |
| 7,361,628 B2 | 4/2008 | Milligan et al. | |
| 7,468,402 B2 | 12/2008 | Yang et al. | |
| 8,022,118 B2 | 9/2011 | Milligan et al. | |
| 8,426,498 B2 | 4/2013 | Milligan et al. | |
| 8,450,249 B2 | 5/2013 | Milligan et al. | |
| 8,450,250 B2 | 5/2013 | Milligan et al. | |
| 2006/0035793 A1 | 2/2006 | Goldman | |
| 2006/0148928 A1 | 7/2006 | Harris et al. | |
| 2010/0069573 A1 | 3/2010 | Arriola et al. | |

FOREIGN PATENT DOCUMENTS

| | | |
|---|---|---|
| GB | 1437132 A1 | 5/1976 |
| JP | 2000-246779 A | 9/2000 |
| WO | 99/57162 A1 | 11/1999 |

OTHER PUBLICATIONS

A.R. Martinez, "Report of Working Group on Definitions", International Centre for Heavy Hydrocarbons—Definition of Bitumen Report, available at http: www.oildrop.org (downloaded Aug. 29, 2006), p. 1 of 4.

J.F. Schabron et al., "Petroleum Residua Solubility Parameter/ Polarity Map: Stability Studies of Residua Pyrolysis", Final Report WRI-99-R004, Western Research Institute, Laramie, WY (Apr. 1999).

Petroleum Technology Transfer Council, Understanding Paraffin and Asphaltene Problems in Oil and Gas Wells (2003).

J. Brandrup et al., eds., "Polymer Handbook", 4th Ed., vol. 2, John Wiley & Sons, Inc., (1999).

Research Institute of Petroleum Industry, "Asphaltene Deposition", (2000-2006).

E. Rogel, "Theoretical Estimation of the Solubility Parameter Distributions of Asphaltenes, Resins, and Oils from Crude Oils and Related Materials", Energy & Fuels, 1997, 11, pp. 920-925.

J. Wang, "Asphaltene: A General Introduction" (2000).

Jacques L. Zakin and Donald L. Hunston, "Effect of Polymer Molecular Variables on Drag Reduction", J. Macromol. Sci.—Phys., B18(4), 795-814 (1980).

H. Marawan, "Pipeline Drag Reducers", (2004).

Abarasi Hart, "A Review of Technologies for Transporting Heavy Crude Oil and Bitumen via Pipelines", J. Petrol Explor Prod Technol (2014), 4:327-336.

D.A. Storm, "Drag Reduction in Heaving Oil", Journal of Energy Resources Technology, Sep. 1999, vol. 121, p. 145-148.

Qun Chen et al, "Optimization Principle for Variable Viscosity Fluid Flow and Its Application to Heavy Oil Flow Drag Reduction", Energy Fuels 2009, vol. 23, pp. 4470-4478.

Marlin D. Holtmyer et al., "Study of Oil Soluble Polymers as Drag Reducers", Polymer Engineering and Science, Mid-May 1980, vol. 20, No. 7, p. 473-477.

Yuxin Ma et al., "Synthesis of Poly(dodecyl methacrylate)s and Their Drag-Reducing Properties", Journal of Applied Science, vol. 88, p. 1622-1626, (2003).

A. Saniere et al., "Pipeline Transportation of Heavy Oils, a Strategic, Economic and Technological Challenge", Oil & Gas Science and Technology, vol. 59 (2004), No. 5, pp. 455-466.

Rafael Martinez-Palou et al., "Transportation of Heaving and Extra-Heavy Crude Oil by Pipeline: A Review", Journal of Petroleum Science and Engineering, 75 (2011), pp. 274-282.

David E. Farley, "Drag Reduction in Nonaqueous Solutions: Structure-Property Correlations for Poly(Isodecyl Methacrylate)", American Institute of Mining, Metallurigical and Petroleum Engineers, Inc., Paper No. SPE 5308, Society of Petroleum Engineers of Aime, Dallas, TX, pp. 147-160, (1975).

CDR Flow Improver Applications Manual, Conoco Specialty Products Inc., pp. 1-52 (approx. 1989-1995).

CDR Flow Improver, Conoco Specialty Products Inc., pp. 1-12, (approx. 1989-1995).

Otto P. Strausz et al., "The Chemistry of Alberta Oils Sands, Bitumens and Heavy Oils", Alberta Energy Research Institute, Calgary, Alberta, Canada, pp. 464-480 (2003).

Polymer Handbook, Fourth Edition, J. Brandrup et al., John Wiley & Sons, Inc., "Solubility Parameter Values", (1999), pp. VII/675-VII715.

Jacques L. Zakin et al., "Effect of Polymer Molecular Variables on Drag Reduction", J. Macromol. Sci.-Phys., B18(4), pp. 795-815, (1980).

D. Mowla et al., "Experimental Study of Drag Reduction by a Polymeric Additive in Slug Two-Phase Flow of Crude Oil and Air in Horizontal Pipes", Chemical Engineering Science, 61 (2006), pp. 1549-1554.

Rafael Martinez-Palou et al., Transportation of Heavy and Extra-Heavy Crude Oil by Pipeline: A Review, Journal of Petroleum Science and Engineering, 75 (2011), pp. 274-282.

Maria A. Barrufet et al., "Reliable Heavy Oil-Solvent Viscosity Mixing Rules for Viscosities Up to 450 K, Oil-Solvent Viscosity Ratios Up to 4×10(5), and any Solvent Proportion", Fluid Phase Equilibria 213 (2003), pp. 65-79.

Lewis J. Fetters et al., "Chain Dimensions and Entanglement Spacings in Dense Macromolecular Systems", Journal of Polymer Science Part B: Polymer Physics, vol. 37, pp. 1023-1033, (1999).

Fetters, L.J. et al., "Chain Dimensions and Entanglement Spacings", in Mark, J.E. (Ed.), Physical Properties of Polymers Handbook, 2nd Ed., pp. 447-454, Springer Science+Business Media, Woodbury, NY, (2007).

Tait, P.J.T. et al., "Thermodynamic Studies on Poly(alpha-olefin)-Solvent Systems", Polymer vol. 11, (1970), pp. 359-373.

"Polymers: A Property Database", 2nd Ed., Ellis, B. et al., (Eds.), CRC Press, Boca Raton, FL, (2016), pp. 1-5.

Handbook of Thermoplastics, 2nd Ed., Olabisi, O. et al. (Eds.), CRC Press, Boca Raton, FL, (2016), Chapter 5 Polyacrylates, pp. 169-192.

Sharp, D.G. et al., "Size and Density of Polystyrene Particles Measured by Ultracentrifugation", J. Biol. Chem., vol. 185, pp. 247-253, (Feb. 16, 1950).

Material Safety Data Sheet for Koch Sure Sol-150 (2000), 1 page.

Declaration of Professor Thomas H. Epps, III., Case IPR2016-00734, U.S. Pat. No. 8,022,118, *Baker Hughes, Inc.* Petitioner v. *Lubrizol Specialty Products, Inc.*, Mar. 31, 2016, 68 pages.

Curriculum Vitae of Professor Thomas H. Epps, III, 33 pages.

U.S. Appl. No. 11/615,539, Preliminary Amendment filed Mar. 10, 2008 with the USPTO, pp. 1-34.

U.S. Appl. No. 11/615,539, Response to Restriction Requirement filed Jul. 16, 2008 with the USPTO, pp. 1-2.

U.S. Appl. No. 11/615,539, Office Action dated Sep. 18, 2008, pp. 1-19.

U.S. Appl. No. 11/615,539, Office Action dated May 29, 2009, pp. 1-13.

U.S. Appl. No. 11/615,539, Request for Reconsideration to Office Action dated Jun. 24, 2009, pp. 1-35.

U.S. Appl. No. 11/615,539, Office Action dated Jul. 27, 2009, pp. 1-5.

U.S. Appl. No. 11/615,539, Response to Final Office Action dated Aug. 27, 2009, pp. 1-4.

U.S. Appl. No. 11/615,539, Office Action dated Oct. 21, 2009, pp. 1-13.

(56) References Cited

OTHER PUBLICATIONS

U.S. Appl. No. 11/615,539, Request for Reconsideration to Office Action dated Apr. 8, 2010, pp. 1-7.
U.S. Appl. No. 11/615,539, Office Action dated Jun. 15, 2010, pp. 1-11.
U.S. Appl. No. 11/615,539, Response to Final Office Action dated Aug. 27, 2010, pp. 1-11.
U.S. Appl. No. 11/615,539, Affidavit Under 37 CFR 1.132 signed by Ray L. Johnston on Aug. 13, 2010, pp. 1-3.
U.S. Appl. No. 11/615,539, Office Action dated Nov. 18, 2010, pp. 1-14.
U.S. Appl. No. 11/615,539, Response to Office Action dated Apr. 8, 2011, pp. 1-7.
U.S. Appl. No. 11/615,539, Notice of Allowance and Fees Due dated May 11, 2011, pp. 1-12.
Transcript of Deposition of Brian Dunn, Ph.D., (excerpt), *Lubrizol Specialty Products, Inc. v. Baker Hughes Inc.*, No. 4:15-cv-02915 (S.D. Tex.), Feb. 9, 2016, pp. 1-6.
Conoco CFR 102 Flow Improver, filed in U.S. Appl. No. 07/381,232, issued as U.S. Pat. No. 4,983,186, Jan. 8, 1991, (approx. 1983-1985).
ConocoPhillips LP 300 Product Datasheet, accessed at https://web.archive.org/web/20040604182725/http://liquidpower.com/ProductSolution/ProductSolution.asp, (2003).
ConocoPhillips LP 400 Product Datasheet, accessed at https://web.archive.org/web/20040604182725/http://liquidpower.com/ProductSolution/ProductSolution.asp, (2003).
Complaint United States District Court, *Lubrizol Specialty Products, Inc. v. Baker Hughes Inc.*, Case 4:15-cv-02915, Document 1 filed in TXSD on Oct. 5, 2015, p. 1 of 23.
Complaint United States District Court, *Lubrizol Specialty Products, Inc. v. Baker Hughes Inc.*, Case 4:15-cv-02915, Exhibit A, filed on Oct. 5, 2015, U.S. Pat. No. 8,022,118 B2, dated Sep. 20, 2011; Milligan et al., "Drag Reduction of Asphaltenic Crude Oils", pp. 1-16.
Complaint United States District Court, *Lubrizol Specialty Products, Inc. v. Baker Hughes Inc.*, Case 4:15-cv-02915, Exhibit B, filed on Oct. 5, 2015, U.S. Pat. No. 8,426,498 B2, dated Apr. 23, 2013; Milligan et al., "Drag Reduction of Asphaltenic Crude Oils", pp. 1-15.
Complaint United States District Court, *Lubrizol Specialty Products, Inc. v. Baker Hughes Inc.*, Case 4:15-cv-02915, Exhibit C, filed on Oct. 5, 2015, U.S. Pat. No. 8,450,249 B2, dated May 28, 2013; Milligan et al., "Drag Reduction of Asphaltenic Crude Oils", pp. 1-15.
Complaint United States District Court, *Lubrizol Specialty Products, Inc. v. Baker Hughes Inc.*, Case 4:15-cv-02915, Exhibit D, filed on Oct. 5, 2015, U.S. Pat. No. 8,450,250 B2, dated May 28, 2013; Milligan et al., "Drag Reduction of Asphaltenic Crude Oils", pp. 1-15.
Complaint United States District Court, *Lubrizol Specialty Products, Inc. v. Baker Hughes Inc.*, Case 4:15-cv-02915, Exhibit E, filed on Oct. 5, 2015, Marketing Brochure, Flo Ultima 91000 DRA Increased Pipeline Flow of Heavy Canadian Crude Oil Blend by 44%; bakerhughes.com, Aug. 2014, pp. 1 of 2.
Complaint United States District Court, *Lubrizol Specialty Products, Inc. v. Baker Hughes Inc.*, Case 4:15-cv-02915, Exhibit F, filed on Oct. 5, 2015, "Enhancing Flow for Canadian Crudes", Heavy Oil, Lacy Rosson, Baker Hughes, Nov. 2014, EPmag.com, pp. 1-4.
Complaint United States District Court, *Lubrizol Specialty Products, Inc. v. Baker Hughes Inc.*, Case 4:15-cv-02915, Exhibit G, filed on Oct. 5, 2015, Marketing Brochure, Flo Ultima 91000 DRA Increased Pipeline Flow of Heavy Canadian Crude Oil Blend by 44%, http://bakerhughes.com/news-and-media/resources/case histories/, Aug. 21, 2015, pp. 1-2.
Complaint United States District Court, *Lubrizol Specialty Products, Inc. v. Baker Hughes Inc.*, Case 4:15-cv-02915, Exhibit H, filed on Oct. 5, 2015, Marketing Brochure, Flo Ultima Heavy Crude Drag Reducing Agents, bakerhughes.com, Jun. 2014, p. 1-2.
Complaint United States District Court, *Lubrizol Specialty Products, Inc. v. Baker Hughes Inc.*, Case 4:15-cv-02915, Exhibit I filed on Oct. 5, 2015, United States Securities and Exchange Commission, Washington, D.C., Form 8-K, Jan. 20, 2015, Baker Hughes Incorporated, News Release, pp. 1-26.
Complaint United States District Court, *Lubrizol Specialty Products, Inc. v. Baker Hughes Inc.*, Case 4:15-cv-02915, filed on Oct. 5, 2015, Civil Cover Sheet, 1 page.
United States District Court, *Lubrizol Specialty Products. Inc. v. Baker Hughes Inc., Baker Petrolite Corp., and Baker Petrolite LLC.*, filed on Oct. 5, 2015, Case 4:15-cv-02915, First Amended Complaint, Apr. 26, 2016, pp. 1-29.
United States District Court, *Lubrizol Specialty Products. Inc. v. Baker Hughes Incorporated*, filed on Oct. 5, 2015, case 4:15-cv-02915, Baker Hughes Incorporated's Answer and Affirmation Defenses, Plaintiff's Complaint for Patent Infringement, Oct. 28, 2015, pp. 1-14.
United States District Court, *Lubrizol Specialty Products. Inc. v. Baker Hughes Incorporated*, filed on Oct. 5, 2015; case 4:15-cv-02915, Baker Hughes Incorporated's Answer and Affirmation Defenses to Plaintiff's Amended Complaint or Patent Infringement and Baker Hughes Incorporated's Counterclaims, May 10, 2016, pp. 1-190.
United States District Court, *Lubrizol Specialty Products. Inc. v. Baker Hughes Incorporated, Baker Petrolite Corporation, and Baker Petrolite LLC.*, filed on Oct. 5, 2015, Case 4:15-cv-02915, Baker Petrolite Corporation's and Baker Petrolite LLC's Answer and Affirmative Defenses to Plaintiff's Amended Complaint for Patent Infringement and Baker Petrolite LLC's Counterclaims, May 18, 2016, pp. 1-190.
United States District Court, *Lubrizol Specialty Products. Inc. v. Baker Hughes Incorporated, Baker Petrolite Corp., and Baker Petrolite LLC.*, filed on Oct. 5, 2015; Case 4:15-cv-02915, Lubrizol Specialty Products, Inc.'s Answer to Baker Hughes Incorporated's Counterclaims, Jun. 3, 2016, pp. 1-21.
United States District Court, *Lubrizol Specialty Products. Inc. v. Baker Hughes Incorporated, Baker Petrolite Corp., and Baker Petrolite LLC.*, filed on Oct. 5, 2015, Case 4:14-cv-02915, Lubrizol Specialty Products, Inc.'s Answer to Baker Petrolite LLC and Baker Petrolite Corporation's Counterclaims, Jun. 7, 2016, pp. 1-21.
United States District Court, *Lubrizol Specialty Products, Inc. v. Flowchem LLC*, filed on Oct. 5, 2015, Case 4:15-cv-02917, Complaint, pp. 1-17.
United States District Court, *Lubrizol Specialty Products, Inc. v. Flowchem LLC*, filed on Oct. 5, 2015, Case 4:15-cv-02917, Exhibit A, U.S. Pat. No. 8,022,118 B2, dated Sep. 20, 2011, "Drag Reduction of Asphaltenic Crude Oils", Milligan et al., pp. 1-16.
United States District Court, *Lubrizol Specialty Products, Inc. v. Flowchem LLC*, filed on Oct. 5, 2015, Case 4:15-cv-02917, Exhibit B, U.S. Pat. No. 8,426,498 B2, dated Apr. 23, 2013, "Drag Reduction of Asphaltenic Crude Oils", Milligan et al., pp. 1-15.
United States District Court, *Lubrizol Specialty Products, Inc. v. Flowchem LLC*, filed on Oct. 5, 2015, Case 4:15-cv-02917, Exhibit C, U.S. Pat. No. 8,450,249 B2, dated May 28, 2013, "Drag Reduction of Asphaltenic Crude Oils", Milligan et al., pp. 1-15.
United States District Court, *Lubrizol Specialty Products, Inc. v. Flowchem LLC*, filed on Oct. 5, 2015, Case 4:15-cv-02917, Exhibit D, U.S. Pat. No. 8,450,250 B2, dated May 28, 2013, "Drag Reduction of Asphaltenic Crude Oils", Milligan et al., pp. 1-15.
United States District Court, *Lubrizol Specialty Products, Inc. v. Flowchem LLC*, filed on Oct. 5, 2015, Case 4:15-cv-02917, Exhibit E, Marketing Brochure, http://www.flowchem-dra.com/index.php/turboflo-applicatons/heavy crude.html, FlowChem, Heavy Crude, Aug. 21, 2015, pp. 1-2.
United States District Court, *Lubrizol Specialty Products, Inc. v. Flowchem LLC*, filed on Oct. 5, 2015, Case 4:15-cv-02917, Exhibit F, Marketing Brochure, http://flowchem-dra.com/index.php/how-turboflo-works.html, How Turboflo Works, Aug. 28, 2015, pp. 1-7.
United States District Court, *Lubrizol Specialty Products, Inc. v. Flowchem LLC*, filed on Oct. 5, 2015, Case 4:15-cv-02917, Civil Cover Sheet, p. 1 of 1.

(56) References Cited

OTHER PUBLICATIONS

United States District Court, *Lubrizol Specialty Products, Inc. v. Flowchem LLC*, filed on Dec. 4, 2015, Case 4:15-cv-02917, Amended Complaint, pp. 1-24.
United States District Court, *Lubrizol Specialty Products, Inc. v. Flowchem LLC*, filed on Dec. 4, 2015, Case 4:15-cv-02917, Exhibit A, U.S. Pat. No. 8,022,118 B2, dated Sep. 20, 2011, Drag Reduction of Asphaltenic Crude Oils, Milligan et al., pp. 1-16.
United States District Court, *Lubrizol Specialty Products, Inc. v. Flowchem LLC*, filed on Dec. 4, 2015, Case 4:15-cv-02917, Exhibit B, U.S. Pat. No. 8,426,498 B2, dated Apr. 23, 2013, Drag Reduction of Asphaltenic Crude Oils, Milligan et al., pp. 1-15.
United States District Court, *Lubrizol Specialty Products, Inc. v. Flowchem LLC*, filed on Dec. 4, 2015, Case 4:15-cv-02917, Exhibit C, U.S. Pat. No. 8,450,249 B2, dated May 28, 2013, Drag Reduction of Asphaltenic Crude Oils, Milligan et al., pp. 1-15.
United States District Court, *Lubrizol Specialty Products, Inc. v. Flowchem LLC*, filed on Dec. 4, 2015, Case 4:15-cv-02917, Exhibit D, U.S. Pat. No. 8,450,250 B2, dated May 28, 2013, Drag Reduction of Asphaltenic Crude Oils, Milligan et al., pp. 1-15.
United States District Court, *Lubrizol Specialty Products, Inc. v. Flowchem LLC*, filed on Dec. 4, 2015, Case 4:15-cv-02917, Exhibit E, Marketing Brochure, http://www.flowchem-dra.com/index.php/turboflo-applicatons/heavy crude.html, FlowChem, Heavy Crude, Aug. 21, 2015, pp. 1-3.
United States District Court, *Lubrizol Specialty Products, Inc. v. Flowchem LLC*, filed on Dec. 4, 2015, Case 4:15-cv-02917, Exhibit F, Marketing Brochure, http://www.flowchem-dra.com/index.php/how-turboflo-works.html, FlowChem, How Turboflo Works, Aug. 28, 2015, pp. 1-7.
United States District Court, *Lubrizol Specialty Products, Inc. v. Flowchem LLC*, filed on Mar. 30, 2016, Case 4:15-cv-02917, Defendents Flowchem LLC's Answer to Plaintiff Lubrizol Specialty Products, Inc.'s Amended Complaint and Flowchem's Counterclaim, pp. 1-17.
United States District Court, *Lubrizol Specialty Products, Inc. v. Flowchem LLC*, filed on Apr. 20, 2016, Case 4:15-cv-02917, Defendent Flowchem LLC's Amended Answer to Plaintiff Lubrizol Specialty Products, Inc.'s Amended complaint and Flowchem's Amended Counterclaim, pp. 1-162.
United States District Court, *Lubrizol Specialty Products, Inc. v. Flowchem LLC*, filed on May 9, 2016, Case 4:15-cv-02917, Lubrizol Specialty Products, Inc.'s Answer to Flowchem LLC's Amended Counterclaim, pp. 1-18.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Burger, Jun. 22, 2016, pp. 1-21.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Carville, Jun. 22, 2016, pp. 1-16.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Eaton, Jun. 22, 2016, pp. 1-19.
*Lubrizol Specialty Products, Inc. v. Baker Hughes Incorporation, Baker Petrolite Corporation, and Baker Petrolite LLC*, Civil Action No. 4:15-cv-02915, Exhibit D-3 El-Gamal, Jun. 22, 2016, pp. 1-18.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Holtmyer, Jun. 22, 2016, pp. 1-18.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Inaoka, Jun. 22, 2016, pp. 1-18.
*Lubrizol Specialty Products, Inc. v. Baker Hughes Incorporation, Baker Petrolite Corporation, and Baker Petrolite LLC*, Civil Action No. 4:15-cv-02915, Exhibit D-3 Kowalik, Jun. 22, 2016, pp. 1-14.
*Lubrizol Specialty Products, Inc. v. Baker Hughes Incorporation, Baker Petrolite Corporation, and Baker Petrolite LLC*, L'Civil Action No. 4:15-cv-02915, Exhibit D-3 Malik '121, Jun. 22, 2016, pp. 1-13.
*Lubrizol Specialty Products, Inc. v. Baker Hughes Incorporated, Baker Petrolite Corporation, and Baker Petrolite LLC*, Civil Action No. 4:15-cv-02915, Baker Hughes's Disclosures Pursuant to Local P.R. 3-3 ("Invalidity Contentions"), Jun. 22, 2016, pp. 1-51.
*Lubrizol Specialty Products, Inc. v. Baker Hughes Incorporated, Baker Petrolite Corporation, and Baker Petrolite LLC*, Civil Action No. 4:15-cv-02915, Exhibit A-1, Identification of Asserted Claims and Limitations Therein, U.S. Pat. No. 8,022,118, Jun. 22, 2016, pp. 1-2.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Burger, Jun. 22, 2016, pp. 1-17.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Carville, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit A-3, Eaton, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit A-3 El-Gamal, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Holmyer, Jun. 22, 2016, pp. 1-14.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Inaoka, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Kowalik, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Malik '121, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Malone, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Motier, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Naiman, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Schmerwitz, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Shen, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Smith, Jun. 22, 2016, pp. 1-16.
*Lubrizol Specialty Products, Inc. v. Baker Hughes Incorporated, Baker Petrolite Corporation, and Baker Petrolite LLC*, Civil Action No. 4:15-cv-02915, Exhibit A-3 Weitzen, Jun. 22, 2016, pp. 1-13.
*Lubrizol Specialty Products, Inc. v. Baker Hughes Incorporated, Baker Petrolite Corporation, and Baker Petrolite LLC*, Civil Action No. 4:15-cv-02915, Exhibit B-1, Identification of Asserted Claims and Limitation Therein, U.S. Pat. No. 8,426,498, Jun. 22, 2016, pp. 1-2.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Burger, Jun. 22, 2016, pp. 1-14.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Carville, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Eaton, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit B-3 El Gamal, Jun. 22, 2016, pp. 1-12.

(56) References Cited

OTHER PUBLICATIONS

*Lubrizol Specialty Products, Inc. v. Baker Hughes Incorporated, Baker Petrolite Corporation, and Baker Petrolite LLC*, Civil Action No. 4:15-cv-02915, Exhibit B-3 Holtmyer, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Inaoka, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Kowalik, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Malik '121, Jun. 22, 2016, pp. 1-7.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Malone, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Motier, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Naiman, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Schmerwitz, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Shen, Jun. 22, 2016, pp. 1-10.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Smith, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit B-3 Weitzen, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit C-1, Identification of Asserted Claims and Limitations Therein, U.S. Pat. No. 8,450,249, Jun. 22, 2016, pp. 1-2.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Burger, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Carville, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Eaton, Jun. 22, 2016, pp. 1-13.
*Lubrizol Specialty Products, Inc. v. Baker Hughes Incorporated, Baker Petrolite Corporation, and Baker Petrolite LLC*, Civil Action No. 4:15-cv-02915, Exhibit C-3 El-Gamal, Jun. 22, 2016, pp. 1-14.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Holtmyer, Jun. 22, 2016, pp. 1-12.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Inaoka, Jun. 22, 2016, pp. 1-13.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Kowalik, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Malik '121, Jun. 22, 2016, pp. 1-7.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Malone, Jun. 22, 2016, pp. 1-13.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Motier, Jun. 22, 2016, pp. 1-13.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Naiman, Jun. 22, 2016, pp. 1-9.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Schmerwitz, Jun. 22, 2016, pp. 1-10.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Shen, Jun. 22, 2016, pp. 1-10.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Smith, Jun. 22, 2016, pp. 1-14.
*Lubrizol Specialty Products, Inc. v. Baker Hughes Incorporated, Baker Petrolite Corporation, and Baker Petrolite LLC*, Civil Action No. 4:15-cv-02915, Exhibit C-3 Weitzen, Jun. 22, 2016, pp. 1-11.
*Lubrizol Specialty Products, Inc. v. Baker Hughes Incorporated, Baker Petrolite Corporation, and Baker Petrolite LLC*, Civil Action No. 4:15-cv-02915, Exhibit D-1, Identification of Asserted Claims and Limitations Therein, U.S. Pat. No. 8,450,250, Jun. 22, 2016, pp. 1-3.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Malone, Jun. 22, 2016, pp. 1-19.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Motier, Jun. 22, 2016, pp. 1-19.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Naiman, Jun. 22, 2016, pp. 1-14.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Schmerwitz, Jun. 22, 2016, pp. 1-16.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Shen, Jun. 22, 2016, pp. 1-15.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Smith, Jun. 22, 2016, pp. 1-20.
*Lubrizol Specialty Products, Inc. v. Baker Hughes Incorporated, Baker Petrolite Corporation, and Baker Petrolite LLC*, Civil Action No. 4:15-cv-02915, Exhibit D-3 Weitzen, Jun. 22, 2016, pp. 1-16.
*Lubrizol Specialty Products, Inc. v. Flowchem LLC*, Civil Action No. 4:15-cv-02917, Defendant Flowchem Llc's Preliminary Invalidity Contentions Pursuant to P.R. 3-3, Jun. 22, 2016, pp. 1-65.
*Lubrizol Specialty Products, Inc. v. Flowchem LLC*, Civil Action No. 4:15-cv-02917, Expert Declaration of Dr. Robert K. Prud'homme, Jun. 22, 2016, pp. 1-20.
*Lubrizol Specialty Products, Inc. v. Flowchem LLC*, Civil Action No. 4:15-cv-02917, Exhibit A, Jun. 22, 2016, pgs. 1-28.
*Lubrizol Specialty Products, Inc. v. Flowchem LLC*, Civil Action No. 4:15-cv-02917, Exhibit B, Jun. 22, 2016, pp. 1-2.
*Lubrizol Specialty Products, Inc. v. Flowchem LLC*, Civil Action No. 4:15-cv-02917, Exhibit C, Jun. 22, 2016, pp. 1-4.
*Lubrizol Specialty Products, Inc. v. Flowchem LLC*, Civil Action No. 4:15-cv-02917, Exhibit D1, Jun. 22, 2016, pp. 1-36.
*Lubrizol Specialty Products, Inc. v. Flowchem LLC*, Civil Action No. 4:15-cv-02917, Exhibit D2, Jun. 22, 2016, pp. 1-53.
*Lubrizol Specialty Products, Inc. v. Flowchem LLC*, Civil Action No. 4:15-cv-02917, Exhibit D3, Jun. 22, 2016, pp. 1-62.
*Lubrizol Specialty Products, Inc. v. Flowchem LLC*, Civil Action No. 4:15-cv-02917, Exhibit D4, Jun. 22, 2016, pp. 1-70.
*Lubrizol Specialty Products, Inc. v. Flowchem LLC*, Civil Action No. 4:15-cv-02917, Exhibit E1, Jun. 22, 2016, pp. 1-25.
*Lubrizol Specialty Products, Inc. v. Flowchem LLC*, Civil Action No. 4:15-cv-02917, Exhibit E2, Jun. 22, 2016, pp. 1-12.
*Lubrizol Specialty Products, Inc. v. Flowchem LLC*, Civil Action No. 4:15-cv-02917, Exhibit E3, Jun. 22, 2016, pp. 1-12.
*Lubrizol Specialty Products, Inc. v. Flowchem LLC*, Civil Action No. 4:15-cv-02917, Exhibit E4, Jun. 22, 2016, pp. 1-17.
*Lubrizol Specialty Products, Inc. v. Flowchem LLC*, Civil Action No. 4:15-cv-02917, Exhibit F1, Jun. 22, 2016, pp. 1-31.

(56) References Cited

OTHER PUBLICATIONS

*Lubrizol Specialty Products, Inc.* v. *Flowchem LLC*, Civil Action No. 4:15-cv-02917, Exhibit F2, Jun. 22, 2016, pp. 1-34.
*Lubrizol Specialty Products, Inc.* v. *Flowchem LLC*, Civil Action No. 4:15-cv-02917, Exhibit F3, Jun. 22, 2016, pp. 1-37.
*Lubrizol Specialty Products, Inc.* v. *Flowchem LLC*, Civil Action No. 4:15-cv-02917, Exhibit F4, Jun. 22, 2016, pp. 1-43.
*Lubrizol Specialty Products, Inc.* v. *Flowchem LLC*, Civil Action No. 4:15-cv-02917, Exhibit G1, Jun. 22, 2016, pp. 1-9.
*Lubrizol Specialty Products, Inc.* v. *Flowchem LLC*, Civil Action No. 4:15-cv-02917, Exhibit G2, Jun. 22, 2016, pp. 1-8.
*Lubrizol Specialty Products, Inc.* v. *Flowchem LLC*, Civil Action No. 4:15-cv-02917, Exhibit G3, Jun. 22, 2016, pp. 1-9.
*Lubrizol Specialty Products, Inc.* v. *Flowchem LLC*, Civil Action No. 4:15-cv-02917, Exhibit G4, Jun. 22, 2016, pp. 1-12.
*Lubrizol Specialty Products, Inc.* v. *Flowchem LLC*, Civil Action No. 4:15-cv-02917, Exhibit H1, Jun. 22, 2016, pp. 1-14.
*Lubrizol Specialty Products, Inc.* v. *Flowchem LLC*, Civil Action No. 4:15-cv-02917, Exhibit H2, Jun. 22, 2016, pp. 1-10.
*Lubrizol Specialty Products, Inc.* v. *Flowchem LLC*, Civil Action No. 4:15-cv-02917, Exhibit H3, Jun. 22, 2016, pp. 1-11.
*Lubrizol Specialty Products, Inc.* v. *Flowchem LLC*, Civil Action No. 4:15-cv-02917, Exhibit H4, Jun. 22, 2016, pp. 1-17.
*Baker Hughes Incorporated* v. *Lubrizol Specialty Products, Inc.*, Case IPR2016-00734, U.S. Pat. No. 8,022,118, Petition for Inter Partes Review, Apr. 1, 2016, pp. 1-66.
*Baker Hughes Incorporated* v. *Lubrizol Specialty Products, Inc.*, Case IPR2016-00734, U.S. Pat. No. 8,022,118, Lubrizol Specialty Products, Inc.'s Preliminary Response to Petition for Inter Partes Review of U.S. Pat. No. 8,022,118 Pursuant to 37 CFR 42.107, Jul. 6, 2016, pp. 1-74.
*Baker Hughes Incorporated* v. *Lubrizol Specialty Products, Inc.*, Case IPR2016-00734, U.S. Pat. No. 8,022,118, Declaration of Kenneth W. Smith, Exhibit 2001, Jul. 6, 2016, pp. 1-13.
Concise Oxford American Dictionary, Oxford University Press, Exhibit 2002, 2006, p. 671.
Oxford English Reference Dictionary, Second Edition, Edited by Judy Pearsall and Bill Trumble, Oxford University Press, Exhibit 2003, 2006, p. 1103.
Collins English Dictionary, HarperCollins Publishers, Seventh Edition 2005, UK Edition ISBN 0-00-719153-7, Exhibit 2004, p. 1236.
Oil & Gas Journal, vol. 81, No. 50, Dec. 12, 1983, Well Completion Technology Report, Exhibit 2005, 3 pages.
120 Oil & Gas Journal, Dec. 12, 1983, Technology, Guide to Export Crudes for the '80s-12, Appendix A Crude Stream Codes, Updated Jan. 2013, p. A-1 to A-18, Exhibit 2006.
Association of Oil Pipe Lines, Pipeline Transportation of Diluted Bitumen from the Canadian Oil Sands, Oct. 14, 2011, 3 pages, Exhibit 2007.
Mark Bobra et al, A Catalogue of Crude Oil and Oil Product Properties, 1990 version, Sep. 1990, 15 pages, Exhibit 2008.
Physical Properties User's Guide, License Agreement Chemstations Inc., Copyright 2004, Version 5.4, Appendix I Crude Oil Databank, Exhibit 2009.
Copyright Environment Canada, Emergencies Science and Technology Division, Bow River Heavy, Exhibit 2010, 1 page.
Otto P. Strausz et al., The Chemistry of Alberta Oil Sands, Bitumens and Heavy Oils, University of Alberta, Calgary, Canada, Digitized by the Internet Archive in 2015, https://archive.org/details/chemistryofalber00stra, Exhibit 2011, 22 pages.
Comprehensive Organic Name Reactions and Reagents, vol. 3, Zerong Wang, A John Wiley & Sons, Inc. Publication, 695 Ziegler-Natta Polymerization (Ziegler-Natta Olefin Polymerization), 2010, Exhibit 2012, 40 pages.
Oil & Gas Journal, Technology, Dec. 19, 1983, Guide to Export Crudes for the '80s-13, Assay Series Concludes With Index, U.S. Streams, Leo R. Aalund, Refining Editor, Exhibit 2013, 5 pages.
EPmag.com, Heavy Oil, Nov. 2014, Enhancing Flow for Canadian Crudes, New DRA Improves the Movement of Heavy Oil Through Pipelines, Lacy Rosson, Baker Hughes, Exhibit 2014, 3 pages.

Flowchem Industries, Heavy Crude, Flowchem DRA, https://flowchem-dra.com/index.php/turboflo-applications/heavy-crude.html, Aug. 21, 2015, Exhibit 2015, 2 pages.
U.S. Pat. No. 6,730,750 B2, dated May 4, 2004, Eaton et al., Methods for Forming Amorphous Ultra-High Molecular Weight Polyolefins for Use As Drag Reducing Agents, Exhibit 2016.
Lubrizol Specialty Products, Inc. Product Datasheet for EP 1000 Flow Improver, Exhibit 2017, Jul. 2014, 2 pages.
USPTO Public Pair Assignment Data for U.S. Appl. No. 07/381,232 for Method and Compositions for Reduction of Drag in Hydrocarbon Fluids, Jun. 27, 2016, Exhibit 2018, 2 pages.
Pat Swafford, Unique Qualties of Canadian Bitumen and Synthetic Crudes, www.digitalrefining.com/article/1000461, PTQ Q1 2010, pp. 103-106, Exhibit 2019.
A Dictionary for the Oil and Gas Industry, First Edition, The University of Texas at Austin Petroleum Extension Service, 2005, Catalog No. 1.35010, ISBN 0-88698-213-8, 4 pages, Exhibit 2020.
*Baker Hughes Inc.* v. *Liquid Power Specialty Products, Inc.* Case IPR2016-01896, Odian, George, Principles of Polymerization, 4th Ed., John Wiley & Sons Inc., 2004, pp. 350-367.
*Baker Hughes Inc.* v. *Liquid Power Specialty Products, Inc.* Case IPR2016-01896, Burger, E.D., et al, "Studies of Drag Reduction Conducted over a Broad Range of Pipeline Conditions when Flowing Prudhoe Bay Crude Oil" The Society of Rheology, Inc. 1980, pp. 603-626.
*Baker Hughes Inc.* v. *Liquid Power Specialty Products, Inc.* Case IPR2016-01896, Buckley, J.S., et al "Asphaltene Precipitation and Solvent Properties of Crude Oils" Petroleum Science and Technology (1998) 16, No. 3-4, pp. 251-285.
*Baker Hughes Inc.* v. *Liquid Power Specialty Products, Inc.* Case IPR2016-01896, Ferguson, K.R., et al "Microbial Pilot Test for the Control of Paraffin and Asphaltenes at Prudhoe Bay", SPE36630, 1996 SPE Annual Technical Conference and Exhibition in Denver, Colorado Oct. 6-9, 1996, 8 pgs.
*Baker Hughes Inc.* v. *Liquid Power Specialty Products, Inc.* Case IPR2016-01896, Holtmyer, M.D., et al, "Study of Oil Soluble Polymers as Drag Reducers", Polymer Engineering and Science, May 1980, vol. 20, No. 7, 5 pgs.
*Baker Hughes Inc.* v. *Liquid Power Specialty Products, Inc.* Case IPR2016-01896, Carnahan, Norman F., Chapter 12: "Precipitation of Asphaltenes in Heavy Oil and Tar Sands", Developments in Petroleum Science 40B, Asphaltenes and Asphalts, 2, (2000) pp. 319-333.
*Baker Hughes Inc.* v. *Liquid Power Specialty Products, Inc.* Case IPR2016-01896, Mowla, D., et al "Experimental Study of drag reduction by a polymeric additive in slug two-phase flow of crude oil and air in horizontal pipes" Chemical Engineering Science 61 (2006) 1549-1554.
*Baker Hughes Inc.* v. *Liquid Power Specialty Products, Inc.* Case IPR2016-01896, Clarification of the Record, dated Oct. 13, 2016, 6 pgs.
*Baker Hughes Inc.* v. *Liquid Power Specialty Products, Inc.* Case IPR2016-01896, Supplemental Certificate of Word Count, dated Oct. 13, 2016, 3 pgs.
*Baker Hughes Inc.* v. *Liquid Power Specialty Products, Inc.* Case IPR2016-01896, Patent Owner's Power of Attorney, dated Oct 25, 2016, 5 pgs.
*Baker Hughes Inc.* v. *Liquid Power Specialty Products, Inc.* Case IPR2016-01896, Patent Owner's Mandatory Notice, dated Oct. 27, 2016, 8 pgs.
*Baker Hughes Inc.* v. *Liquid Power Specialty Products, Inc.* Case IPR2016-01896, Patent Owner's Supplemental Mandatory Notices, dated Jan. 13, 2017, 8 pgs.
*Baker Hughes Inc.* v. *Liquid Power Specialty Products, Inc.* Case IPR2016-01896, LiquidPower Specialty Products, Inc.'s Prel Resp to Petition for Inter Partes Review of U.S. Pat. No. 8,022,118, dated Jul. 6, 2016, 74 pgs.
*Baker Hughes Inc.* v. *Liquid Power Specialty Products, Inc.* Case IPR2016-01896, Exhibit 2028—Frederick R. Haeberle, "How Reservoir property variations may effect Frio hydrocarbon volumes" Exploration & Development, Oil & Gas Journal, Oct. 15, 2001, 5 pgs.

(56) References Cited

OTHER PUBLICATIONS

*Baker Hughes Inc.* v. *Liquid Power Specialty Products, Inc.* Case IPR2016-01896, Exhibit 2029—Email—Bruce Cannon to Melissa Hotze, Nov. 21, 2016, 2 pgs.

*Baker Hughes Inc.* v. *Liquid Power Specialty Products, Inc.* Case IPR2016-01896, Exhibit 2035—Gunter, Bill, et al, "Overcoming the Barriers to Commerical CO2-EOR in Alberta Canada" Alberta Innovates—Energy and Environment Solutions, Final Report, May 31, 2013, 9 pgs.

*Baker Hughes Inc.* v. *Lubrizol Specialty Products, Inc.*, Case IPR2016-01896, Notice of Filing Date Accorded, Oct. 14, 2016, 3 pgs.

*Baker Hughes Inc.* v. *Liquid Power Specialty Products, Inc.* Case IPR2016-01901, Petition for Inter Partes Review, dated Oct. 6, 2016, 61 pgs.

*Baker Hughes Inc.* v. *Liquid Power Specialty Products, Inc.* Case IPR2016-01901, Clarification of the Record, dated Oct. 13, 2016, 6 pgs.

*Baker Hughes Inc.* v. *Liquid Power Specialty Products, Inc.* Case IPR2016-01901, Patent Owner's Power of Attorney, dated Oct. 25, 2016, 5 pgs.

*Baker Hughes Inc.* v. *Liquid Power Specialty Products, Inc.* Case IPR2016-01901, Patent Owner's Supplemental Mandatory Notices, dated Jan. 13, 2017, 8 pgs.

*Baker Hughes Inc.* v. *Liquid Power Specialty Products, Inc.* Case IPR2016-01901, Patent Owner LiquidPower Specialty Products Inc.'s Prel Resp to Petition for Inter Partes Review of U.S. Pat No. 8,450,249, dated Jan. 17, 2017, 70 pgs.

*Baker Hughes Inc.* v. *Liquid Power Specialty Products, Inc.* Case IPR2016-01901, Exhibit 2002—Summons in a Civil Action, dated Oct. 12, 2015, 3 pgs.

*Baker Hughes Inc.* v. *Liquid Power Specialty Products, Inc.* Case IPR2016-01901, Exhibit 2004—Decision—Institution of Inter Partes Review, dated Oct. 4, 2016, 33 pgs.

*Baker Hughes Inc.* v. *Liquid Power Specialty Products, Inc.* Case IPR2016-01901, Exhibit 2009—The Merck Index, 22th Ed., Merck & Co., Inc. 1989, 6 pgs.

*Baker Hughes Inc.* v. *Liquid Power Specialty Products, Inc.* Case IPR2016-01901, Exhibit 2014—Email—Jeff Andrews to Doug McClellan, dated Jul. 11, 2016, 1 pg.

*Baker Hughes Inc.* v. *Liquid Power Specialty Products, Inc.* Case IPR2016-01901, Exhibit 2015—Email—Jeff Andrews to LSPI BH FC, dated Jul. 19, 2016, 1 pg.

*Baker Hughes Inc.* v. *Liquid Power Specialty Products, Inc.* Case IPR2016-01901, Exhibit 2001—*Lubrizol Specialty Products Inv.* v. *Baker Hughes, Inc.*, Complaint dated Oct. 5, 2015, 23 pgs.

*Baker Hughes Inc.* v. *Liquid Power Specialty Products, Inc.* Case IPR2016-01901, Exhibit 2006—Veatch, Jr., R.W., Overview of Current Hydraulic Fracturing Design and Treatment—Part 2 Distinguished Author Series, May 1983, 12 pgs.

*Baker Hughes Inc.* v. *Liquid Power Specialty Products, Inc.* Case IPR2016-01901, Exhibit 2010—*Lubrizol Specialty Products, Inc.* v. *Baker Hughes, Inc.* Civil Action No. 4:15-cv-02915, Baker Hughes Disclosures Pursuant to Local P.R. 3-3 Invalidity Contentions, dated Jun. 22, 2016, 32 pgs.

*Baker Hughes Inc.* v. *Liquid Power Specialty Products, Inc.* Case IPR2016-01901, Exhibit 2017—Juyal, Priyanka, et al, Effect of Crude Oil Aging on Asphaltene Inhibitor Product Recommendation, Journal of Dispersion Science and Technology, 32:1096-1104, 2011, 9 pgs.

*Baker Hughes Inc.* v. *Liquid Power Specialty Products, Inc.* Case IPR2016-01901, Exhibit 2029—Email re BG013806, Bruce Cannon to Melissa Hotze, dated Nov. 21, 2016, 2 pgs.

*Baker Hughes Inc.* v. *Liquid Power Specialty Products, Inc.* Case IPR2016-01901, Exhibit 2019—Enhancing flow for Canadian crudes, New DRA Improves the movement of heavy oil through pipelines, EPmag.com, Nov. 2014, 3 pgs.

*Baker Hughes Inc.* v. *Liquid Power Specialty Products, Inc.* Case IPR2016-01901, Exhibit 2021—*Lubrizol Specialty Products, Inc.* v. *Baker Hughes Inc.*, Civil Action No. 4:15-cv-02915, Videotaped Deposition of John C. Fetzer, Ph. D., (excerpted p. 255), dated Sep. 7, 2016, 2 pgs.

*Baker Hughes Inc.* v. *Lubrizol Specialty Products Inc.*, Case IPR2016-01901, Notice of Filing Date Accorded, dated Oct. 14, 2016, 3 pgs.

*Baker Hughes Inc.* v. *Lubrizol Specialty Products Inc.*, Case IPR2016-01903, Exhibit 2001—*Lubrizol Specialty Products, Inc.* v. *Baker Hughes Inc.*, Civil Action No. 4:15-cv-02915, Complaint against Baker Hughes Inc., dated Oct. 5, 2015, 23 pgs.

*Baker Hughes Inc.* v. *Lubrizol Specialty Products Inc.*, Case IPR2016-01903, Exhibit 2003—*Baker Hughes Inc.* v. *Lubrizol Specialty Products, Inc.*, Case IPR2016-00734, LSPIs Preliminary Response to Petition for Inter Partes Review of U.S. Pat No. 8,022,118, dated Jul. 6, 2016, 74 pgs.

*Baker Hughes Inc.* v. *Lubrizol Specialty Products Inc.*, Case IPR2016-01903, Exhibit 2004—*Baker Hughes Inc.* v. *Lubrizol Specialty Products, Inc.*, Case IPR2016-00734, Decision Institution of Inter Partes Review, dated Oct. 4, 2016, 33 pgs.

*Baker Hughes Inc.* v. *Lubrizol Specialty Products Inc.*, Case IPR2016-01903, Exhibit 2027—*Baker Hughes Inc.* v. *Lubrizol Specialty Products, Inc.*, Case IPR2016-00734, Petition for Inter Partes Review, dated Apr. 1, 2016, 66 pgs.

*Baker Hughes Inc.* v. *Lubrizol Specialty Products Inc.*, Case IPR2016-01903, *Baker Hughes Inc.* v. *Lubrizol Specialty Products, Inc.*, Case IPR2016-01903, Notice of Filing Date Accorded to Petition, dated Oct. 14, 2016, 3 pgs.

*Baker Hughes Inc.* v. *Lubrizol Specialty Products Inc.*, Case IPR2016-01905, Petition for Inter Partes Review, dated Oct. 6, 2016, 72 pgs.

*Baker Hughes Inc.* v. *Lubrizol Specialty Products Inc.*, Case IPR2016-01905, Clarification of the Record, dated Oct. 13, 2016, 6 pgs.

*Baker Hughes Inc.* v. *Lubrizol Specialty Products Inc.*, Case IPR2016-01905, Patent Owner's Power of Attorney, dated Oct. 25, 2016, 5 pgs.

*Baker Hughes Inc.* v. *Lubrizol Specialty Products Inc.*, Case IPR2016-01905, Patent Owner's Supplemental Mandatory Notice, dated Jan. 13, 2017, 8 pgs.

*Baker Hughes Inc.* v. *Lubrizol Specialty Products Inc.*, Case IPR2016-01905, Patent Owner's Mandatory Notice, dated Oct. 27, 2017, 8 pgs.

*Baker Hughes Inc.* v. *Lubrizol Specialty Products Inc.*, Case IPR2016-01905, Patent Owner LiquidPower Specialty Products Inc.'s Preliminary Response to Petition for Inter Partes Review of U.S. Pat. No. 8,450,250, dated Jan. 17, 2017, 74 pgs.

*Baker Hughes Inc.* v. *Lubrizol Specialty Products Inc.*, Case IPR2016-01905, Notice of Filing Date Accorded to Petition, dated Oct. 14, 2016, 3 pgs.

*Baker Hughes Inc.* v. *LiquidPower Specialty Products Inc.*, Case IPR2016-00734, Conduct of the Proceeding Granting Petitioner's Request to Extend the Reply Word Count, dated Mar. 31, 2017, 5 pgs.

*Baker Hughes Inc.* v. *LiquidPower Specialty Products Inc.*, Case IPR2016-01896, Decision Denying Institution of Inter Partes Review, dated Mar. 31, 2017, 12 pgs.

*Baker Hughes Inc.* v. *LiquidPower Specialty Products Inc.*, Case IPR2016-01903, Decision Institution of Inter Partes Review, dated Mar. 31, 2017, 30 pgs.

*Baker Hughes Inc.* v. *LiquidPower Specialty Products Inc.*, Case IPR2016-01903, Scheduling Order, dated Mar. 31, 2017, 7 pgs.

*Baker Hughes Inc.* v. *Lubrizol Specialty Products, Inc.*, Case IPR2016-00734, Patent Owner's Objections to Admissibility of Evidence Served with Petition, dated Oct. 17, 2016, 8 pgs.

*Baker Hughes Inc.* v. *Lubrizol Specialty Products, Inc.*, Case IPR2016-00734, Petitioner's Evidentiary Objections, dated Oct. 18, 2016, 4 pgs.

*Baker Hughes Inc.* v. *Lubrizol Specialty Products, Inc.*, Case IPR2016-00734, Patent Owner's List of Proposed Motions, dated Oct. 31, 2016, 9 pgs.

(56) References Cited

OTHER PUBLICATIONS

*Baker Hughes Inc.* v. *Lubrizol Specialty Products, Inc.*, Case IPR2016-00734, Patent Owner's Notice of Cross-Examination Deposition of Declarant Thomas H. Epps, III, dated Nov. 2, 2016, 5 pgs.
*Baker Hughes Inc.* v. *Lubrizol Specialty Products, Inc.*, Case IPR2016-00734, Patent Owner's Notice of Stipulation Regarding Schedule, dated Nov. 3, 2016, 5 pgs.
*Baker Hughes Inc.* v. *Lubrizol Specialty Products, Inc.*, Case IPR2016-00734, Joint Submission of District Court Order Regarding Disclosure of Information to PTAB, dated Nov. 30, 2016, 12 pgs.
*Baker Hughes Inc.* v. *Lubrizol Specialty Products, Inc.*, Case IPR2016-00734, Conference Call Transcript, Nov. 30, 2016, 20 pgs.
*Baker Hughes Inc.* v. *Lubrizol Specialty Products, Inc.*, Case IPR2016-00734, Petitioner's Updated Exhibit List, dated Dec. 1, 2016, 5 pgs.
*Baker Hughes Inc.* v. *Lubrizol Specialty Products, Inc.*, Case IPR2016-00734, Petitioner's Updated Exhibit List—dated Dec. 2, 2016, 5 pgs.
*Baker Hughes Inc.* v. *Lubrizol Specialty Products, Inc.*, Case IPR2016-00734, Transcript of Conference Call, dated Dec. 1, 2016, 56 pgs.
*Baker Hughes Inc.* v. *Lubrizol Specialty Products, Inc.*, Case IPR2016-00734, Patent Owners Combined Motion to Seal and Motion for Protective Order, dated Dec. 5, 2016, 39 pgs.
*Baker Hughes Inc.* v. *Lubrizol Specialty Products, Inc.*, Case IPR2016-00734, Petitioner's Combined Motion to Seal and Motion for Entry of Default Protective Order. dated Dec. 12, 2016, 12 pgs.
*Baker Hughes Inc.* v. *Lubrizol Specialty Products, Inc.*, Case IPR2016-00734, Patent Owner's Motion to Seal its Reply in Support of its Motion for Additional Discovery and Motion for Authorization to Compel Discovery, dated Dec. 22, 2016, 6 pgs.
*Baker Hughes Inc.* v. *Lubrizol Specialty Products, Inc.*, Case IPR2016-00734, Patent Owner Lubrizol Specialty Products, Inc.'s Motion for Pro Hac Vice for Aaron Y. Huang, dated Dec. 16, 2016, 7 pgs.
*Baker Hughes Inc.* v. *Lubrizol Specialty Products, Inc.*, Case IPR2016-00734, Affidavit of Aaron Y. Huang in Support of Motion for Pro Hac Vice, dated Dec. 16, 2016, 4 pgs.
*Baker Hughes Inc.* v. *Lubrizol Specialty Products, Inc.*, Case IPR2016-00734, Petitioner's Updated Exhibit List, dated Dec. 22, 2016, 5 pgs.
*Baker Hughes Inc.* v. *Lubrizol Specialty Products, Inc.*, Case IPR2016-00734, Patent Owner's Motion to Seal its Addendum to its Motion for Additional Discovery and Motion for Authorization to Compel Discovery, dated Dec. 22, 2016, 6 pgs.
*Baker Hughes Inc.* v. *Lubrizol Specialty Products, Inc.*, Case IPR2016-00734, Patent Owner's Motion to Seal, dated Dec. 22, 2016, 6 pgs.
*Baker Hughes Inc.* v. *Lubrizol Specialty Products, Inc.*, Case IPR2016-00734, Exhibit 2026—Markman Hearing (Amended)—Nov. 18, 2016, *LSPI* v. *Baker Hughes, Inc.* Case No. 4:1-CV-02915, 4 pgs.
*Baker Hughes Inc.* v. *Lubrizol Specialty Products, Inc.*, Case IPR2016-00734, Exhibit 2030—Memorandum Opinion, Findings and Order, dated Jan. 27, 2017, 14 pgs.
*Baker Hughes Inc.* v. *Lubrizol Specialty Products, Inc.*, Case IPR2016-00734, Exhibit 2022—Deposition of Thomas H. Epps, III, Nov. 30, 2016, 152 pgs.
*Baker Hughes Inc.* v. *Lubrizol Specialty Products, Inc.*, Case IPR2016-00734, Exhibit 2029—RBN Energy LLC, "You Can't Always Get Out What You Put In—Crude Oil Pipeline Quality Banks" Sandy Fielden, Aug. 29, 2013.
*Baker Hughes Inc.* v. *Lubrizol Specialty Products, Inc.*, Case IPR2016-00734, Exhibit 2031—Pipeline & Gas Journal, Jun. 2009, System Maintenance, 4 pgs.
*Baker Hughes Inc.* v. *Lubrizol Specialty Products, Inc.*, Case IPR2016-00734, Exhibit 2038—Fingas, Merv F., "Water-in-Oil Emulsions: Formation and Prediction" Journal of Petroleum Science Research (JPSR) vol. 3, Issue 1, Jan. 2014, 12 pgs.
*Baker Hughes Inc.* v. *Lubrizol Specialty Products, Inc.*, Case IPR2016-00734, Exhibit 2039—Saniere, A., et al "Pipeline Transportation of Heavy Oils, a Strategic, Economic and Technological Challenge", Oil & Gas Science and Technology, Rev. IFP, vol. 59 (2004), No. 5 pp. 455-466, 12 pgs.
*Baker Hughes Inc.* v. *Lubrizol Specialty Products, Inc.*, Case IPR2016-00734, Exhibit 2044—LSPI Case Study—Drag Reducing Heavy Crude Pipelines with Low Reynolds Numbers, Jul. 2014, LSPI_DRA_0054211, 2 pgs.
*Baker Hughes Inc.* v. *Lubrizol Specialty Products, Inc.*, Case IPR2016-00734, Exhibit 2046—Bobra, Mark, et al, "A Catalogue of Crude Oil and Oil Product Properties" Sep. 1990, 7 pgs.
*Baker Hughes Inc.* v. *Lubrizol Specialty Products, Inc.*, Case IPR2016-00734, Exhibit 2048—National Energy Board Canada, Reasons for Decision, Interprovincial Pipe Line Inc. OH-1-96, Jul. 1996, Facilities and Toll Methodology, 36 pgs (ISBN 0-662-24825-2).
*Baker Hughes Inc.* v. *Lubrizol Specialty Products, Inc.*, Case IPR2016-00734, Exhibit 2085—*Lubrizol Specialty Products, Inc.* v. *Flowchem LLC*, Civil Action No. 4:15-cv-02917, Stipulated Final Consent Judgment and Order for Injunction, Jul. 21, 2016, 8 pgs.
*Baker Hughes Inc.* v. *Lubrizol Specialty Products, Inc.*, Case IPR2016-00734, Exhibit 2096—Lu-chien Chou, Dissertation—Drag Reducing Cationic Surfactant Solutions for District Heating and Cooling Systems, The Ohio State University, 1991, 3 pgs.
*Baker Hughes Inc.* v. *Lubrizol Specialty Products, Inc.*, Case IPR2016-00734, Exhibit 2098—Videotaped Deposition or Brian Dunn, PhD., Feb. 9, 2016, 3 pgs.
*Baker Hughes Inc.* v. *Lubrizol Specialty Products, Inc.*, Case IPR2016-00734, *Baker Hughes Inc.* v. *Liquid Power Specialty Products, Inc.* Case IPR2016-00734, "Petitioner's Updated Mandatory Notices" Feb. 13, 2017, 6 pgs.
*Baker Hughes Inc.* v. *Liquid Power Specialty Products, Inc.* Case IPR2016-00734, Petitioner's Evidentiary Objections, dated Feb. 14, 2016, 7 pgs.
*Baker Hughes Inc.* v. *Liquid Power Specialty Products, Inc.* Case IPR2016-00734, "Petition for Inter Pules Review" dated Jul. 6, 2016, 74 pgs.
*Baker Hughes Inc.* v. *Liquid Power Specialty Products, Inc.* Case IPR2016-00734, "Notice of Filing Date Accorded to Petition" Apr. 7, 2016.
*Baker Hughes Inc.* v. *Lubrizol Specialty Products, Inc.*, Case IPR2016-00734, Exhibit 1008—Zakin, Jacques, et al, "Effect of Polymer Molecular Variables on Drag Reduction", J. Macromol. Sci-Phys, B18(4), 795-814 (1980), 22 pgs.
*Baker Hughes Inc.* v. *Lubrizol Specialty Products, Inc.*, Case IPR2016-00734, Exhibit 1009—Mowla, D., et al, "Experimental study of drag reduction by a polymeric additive in slug two-phase flow of crude oil and air in horizontal pipes" Chemical Engineering Science 61, (2006) 1549-1554, 6 pgs.
*Baker Hughes Inc.* v. *Lubrizol Specialty Products, Inc.*, Case IPR2016-00734, Exhibit 1010—Koch Material Safety Data Sheet, Dec. 11, 2000, 8 pgs.
*Baker Hughes Inc.* v. *Lubrizol Specialty Products, Inc.*, Case IPR2016-00734, Exhibit 1011—Barrufet, Maria A., et al, "Reliable heavy oil-solvent viscosity mixing rules for viscosities up to 450 K, oil-solvent viscosity ratios up to $4 \times 10^5$, and any solvent proportion" Elsevier, Petroleum Engineering Dept, Texas A&M University, College Station, TX, Nov. 25, 2002, 65 pgs.
*Baker Hughes Inc.* v. *Lubrizol Specialty Products, Inc.*, Case IPR2016-00734, Exhibit 1012—Fetters, Lewis J., Chain Dimensions and Entanglement Spacings in Dense Macromolecular Systems, Journal of Polymer Science: Part B: Polymer Physics, vol. 37, 1023-1033 (1999), 11 pgs.
*Baker Hughes Inc.* v. *Lubrizol Specialty Products, Inc.*, Case IPR2016-00734, Exhibit 1031—Martinez-Palou, Rafael, "Transportation of heavy and extra-heavy crude oil by pipeline: A review" Journal of Petroleum Science and Engineering 75 (2011) 274-282, 9 pgs.

(56) References Cited

OTHER PUBLICATIONS

*Baker Hughes Inc. v. Lubrizol Specialty Products, Inc.*, Case IPR2016-00734, Exhibit 1032—Videotaped Deposition of Brian Dunn, PhD, Feb. 9, 2016, 6 pgs.
*Baker Hughes Inc. v. Lubrizol Specialty Products, Inc.*, Case IPR2016-00734, Exhibit 1033—Mark, James E., "Physical Properties of Polymers", Polymer Research Center and Dept. of Chemistry, Cincinnati, Ohio, Dec. 2006, 23 pgs.
*Baker Hughes Inc. v. Lubrizol Specialty Products, Inc.*, Case IPR2016-00734, Exhibit 1034—Tait, P.J.T., and Livesey, P.J., "Thermodynamic studies on poly ($\propto$-olefin)-solvent systems", Polymer, Elsevier, vol. 11, Issue 7, Jul. 1970, pp. 359-373, 15 pgs.
*Baker Hughes Inc. v. Lubrizol Specialty Products, Inc.*, Case IPR2016-00734, Exhibit 1035—Polymers A Property Database, 2nd Ed., CRC Press 2008, 5 pgs.
*Baker Hughes Inc. v. Lubrizol Specialty Products, Inc.*, Case IPR2016-00734, Exhibit 1036—Handbook of Thermoplastics CRC Press 2016.
*Baker Hughes Inc. v. Lubrizol Specialty Products, Inc.*, Case IPR2016-00734, Exhibit 1037—Sharp, D.G. and Beard, J.W., "Size and Density of Polystyrene Particles Measured by Ultracentrifugation", J.Biol Chem. 1950, 185;: Feb. 16, 1950, 247-253 8 pgs.
*Baker Hughes Inc. v. Lubrizol Specialty Products, Inc.*, Case IPR2016-00734, 2013 Guide to Export Crudes for the 80's.
*Baker Hughes Inc. v. Lubrizol Specialty Products, Inc.*, Case IPR2016-00734, Decision, Institution of Inter Partes Review, Entered Oct. 4, 2016, 33 pgs.
*Baker Hughes Inc. v. Lubrizol Specialty Products, Inc.*, Case IPR2016-00734, Order—Conduct of the Proceeding, 37 C.F.R. 42.5, Dec. 2, 2016, 5 pgs.
*Baker Hughes Inc. v. Lubrizol Specialty Products, Inc.*, Case IPR2016-01896, Youg, R.J., et al, Introduction to Polymers, 2nd Ed. 1991, CRC Press, pp. 196-199.
Case IPR2016-01905, *Baker Hughes Inc. v. LiquidPower Specialty Products, Inc.*, Patent Owner's Unopposed Motion for Protective Order, 21 pgs dated May 8, 2017.
Case IPR2016-01905, *Baker Hughes Inc. v. LiquidPower Specialty Products, Inc.*, Patent Owner's Notice of Cross-Examination Deposition of Baker Hughes, Inc. Declarant Thomas H. Epps, III, 5 pgs dated May 26, 2017.
Case IPR2016-01905, *Baker Hughes Inc. v. LiquidPower Specialty Products, Inc.*, Patent Owner's Notice of Stipulation Regarding Schedule, 5pgs, dated Jun. 9, 2017.
Case IPR2016-00734, *Baker Hughes Inc. v. LiquidPower Specialty Products, Inc.*, Patent Owner Exhibit 2101, dated Apr. 28, 2017.
Case IPR2016-00734, *Baker Hughes Inc. v. LiquidPower Specialty Products, Inc.*, Patent Owner Exhibit 2300, dated Apr. 28, 2017.
Case IPR2016-00734, *Baker Hughes Inc. v. LiquidPower Specialty Products, Inc.*, Patent Owner's Second Notice of Cross-Examination Deposition of Baker Hughes, Inc. Declarant Thomas H. Epps, III, 5 pgs, dated May 5, 2017.
Case IPR2016-00734, *Baker Hughes Inc. v. LiquidPower Specialty Products, Inc.*, Petitioner's Reply (Redacted) May 8, 2017.
Case IPR2016-00734, *Baker Hughes Inc. v. LiquidPower Specialty Products, Inc.*, Transcript from Apr. 26, 2017 cross-examination of Brian Dunn, Ph.D. May 8, 2017.
Case IPR2016-00734, *Baker Hughes Inc. v. LiquidPower Specialty Products, Inc.*, Petitioner's Motion to Seal, dated May 8, 2017.
Case IPR2016-00734, *Baker Hughes Inc. v. LiquidPower Specialty Products, Inc.*, PO Obj to Admissibility of Evidence Served with Pet Baker Hughes Inc.s Reply in Support of its Pet for IPR of U.S. Pat. No. 8,022,118, dated May 15, 2017.
Case IPR2016-00734, *Baker Hughes Inc. v. LiquidPower Specialty Products, Inc.*, Patent Owner's Notice of Stipulation Regarding Schedule, 5 pgs, dated May 22, 2017.
Case IPR2016-00734, *Baker Hughes Inc. v. LiquidPower Specialty Products, Inc.*, Petitioner's Request for Oral Argument, dated May 23, 2017.

Case IPR2016-00734, *Baker Hughes Inc. v. LiquidPower Specialty Products, Inc.*, Exhibit 2303, Methacrylate—Acrylic Monomers/Sigma-Aldrich, dated May 16, 2017.
Case IPR2016-00734, *Baker Hughes Inc. v. LiquidPower Specialty Products, Inc.*, Exhibit 2304, Sartomer, Acylate Monomers, dated May 23, 2017.
Case IPR2016-00734, *Baker Hughes Inc. v. LiquidPower Specialty Products, Inc.*, Exhibit 2306, Crude Oil Price Bulletin, (2016-009) dated May 23, 2017.
Case IPR2016-00734, *Baker Hughes Inc. v. LiquidPower Specialty Products, Inc.*, Exhibit 2302, Acrylate-Acrylic Monomers—Sigma-Aldrich, Acrylate, dated May 23, 2017.
Case IPR2016-00734, *Baker Hughes Inc. v. LiquidPower Specialty Products, Inc.*, Exhibit 2307, Heavy Crudes on US Gulf gaining strength relative to light crudes—Oil—Platts News Article, S&P Global Platts, Houston Nov. 12, 2011, 2 pgs, filed May 23, 2017.
Case IPR2016-00734, *Baker Hughes Inc. v. LiquidPower Specialty Products, Inc.*, Exhibits 2308, C&EN Plant Shutdowns, Petroleum's Gunk, Asphaltenes yield to mass spectrometry, vol. 78, No. 38, Sep. 21, 2009, 9 pgs, filed May 23, 2017.
Case IPR2016-00734, *Baker Hughes Inc. v. LiquidPower Specialty Products, Inc.*, Patent Owner's Request for Oral Argument Pursuant, dated May 23, 2017.
Case IPR2016-00734, *Baker Hughes Inc. v. LiquidPower Specialty Products, Inc.*, Patent Owner's Motion to Exclude, dated May 23, 2017.
Case IPR2016-00734, *Baker Hughes Inc. v. LiquidPower Specialty Products, Inc.*, Patent Owner's Motion for Observations on Cross Exam of Reply Witness Thomas H. Epps, III, Ph. D., dated May 25, 2017.
Case IPR2016-00734, *Baker Hughes Inc. v. LiquidPower Specialty Products, Inc.*, Exhibit 2310, Transcript of Telephone Conf, May 24, 2017, filed May 26, 2017.
Case IPR2016-00734, *Baker Hughes Inc. v. LiquidPower Specialty Products, Inc.*, Patent Owner's Motion to Seal, dated May 31, 2017.
Case IPR2016-00734, *Baker Hughes Inc. v. LiquidPower Specialty Products, Inc.*, Redacted Patent Owner's Sur-Reply, dated May 31, 2017.
Case IPR2016-00734, *Baker Hughes Inc. v. LiquidPower Specialty Products, Inc.*, Petitioner's Opposition to Patent Owner's Motion to Exclude, dated Jun. 6, 2017.
Case IPR2016-00734, *Baker Hughes Inc. v. LiquidPower Specialty Products, Inc.*, Petitioner's Response to Patent Owner's Motion for Observations on Cross Examination of Reply Witness Thomas H. Epps, III, dated Jun. 8, 2017.
Case IPR2016-00734, *Baker Hughes Inc. v. LiquidPower Specialty Products, Inc.*, Redacted Public Version of the Deposition of Transcript of Thomas Henry Epps (May 17, 2017), filed Jun. 12, 2017.
Case IPR2016-00734, *Baker Hughes Inc. v. LiquidPower Specialty Products, Inc.*, Trial Hearing Order, 7 pgs, dated May 31, 2017.
Case IPR2016-00734, *Baker Hughes Inc. v. LiquidPower Specialty Products, Inc.*, Exhibit 1044, Declaration of Jack Bradford Wards, 3 pgs, dated May 5, 2017.
Case IPR2016-01901, *Baker Hughes Inc. v. LiquidPower Specialty Products, Inc.*, Patent Owner's Unopposed Motion for Protective Order, 21 pgs, dated May 8, 2017.
Case IPR2016-01901, *Baker Hughes Inc. v. LiquidPower Specialty Products, Inc.*, Patent Owner's Notice of Stipulation Regarding Schedule, 5 pgs, dated Jun. 9, 2017.
Case IPR2016-01903, *Baker Hughes Inc. v. LiquidPower Specialty Products, Inc.*, Patent Owner's Unopposed Motion for Protective Order, 21 pgs, dated May 8, 2017.
Case IPR2016-01903, *Baker Hughes Inc. v. LiquidPower Specialty Products, Inc.*, Patent Owner's Notice of Stipulation Regarding Schedule, 5 pgs, dated Jun. 9, 2017.
Case IPR2016-00734, *Baker Hughes Inc. v. LiquidPower Specialty Products, Inc.*, Reply in Support of Patent Owner's Motion to Exclude, 9 pgs, dated Jun. 13, 2017.
Case IPR2016-01901, *Baker Hughes Inc. v. LiquidPower Specialty Products, Inc.*, Patent Owner's Motion to Seal, 6 pgs, dated Jun. 30, 2017.

(56) References Cited

OTHER PUBLICATIONS

Case IPR2016-01901, *Baker Hughes Inc.* v. *LiquidPower Specialty Products, Inc.*, Order, Patent Owner's Unopposed Motion for Protective Order, 6 pgs, dated Jun. 30, 2017.
Case IPR2016-01903, *Baker Hughes Inc.* v. *LiquidPower Specialty Products, Inc.*, Patent Owner's Motion to Seal, 6 pgs, dated Jun. 30, 2017.
Case IPR2016-01903, *Baker Hughes Inc.* v. *LiquidPower Specialty Products, Inc.*, Patent Owners Unopposed Motion for Protective Order, 6 pgs, dated Jun. 30, 2017.
Case IPR2016-01905, *Baker Hughes Inc.* v. *LiquidPower Specialty Products, Inc.*, Patent Owner's Motion to Seal, 6 pgs, dated Jun. 30, 2017.
Case IPR2016-01905, *Baker Hughes Inc.* v. *LiquidPower Specialty Products, Inc.*, Patent Owner's Response to Petition for Inter Partes Review of U.S. Pat. No. 8,450,250, 90 pgs, dated Jun. 30, 2017.
Case IPR2016-01905, *Baker Hughes Inc.* v. *LiquidPower Specialty Products, Inc.*, Order, Patent Owner's Unopposed Motion for Protective Order, 6 pgs, dated Jun. 30, 2017.
Case IPR2016-00734, *Baker Hughes Inc.* v. *LiquidPower Specialty Products, Inc.*, Transcript from Apr. 26, 2017 cross-examination of Brian Dunn, Ph.D. May 8, 2017 .
Case IPR2016-00734, *Baker Hughes Inc.* v. *LiquidPower Specialty Products, Inc.*, Exhibit 2304, Sartomer, Acylate Monomers, dated May 23, 2017 .
Case IPR2016-00734, *Baker Hughes Inc.* v. *LiquidPower Specialty Products, Inc.*, Record of Oral Hearing, dated Jul. 4, 2017, 52 pgs.

\* cited by examiner

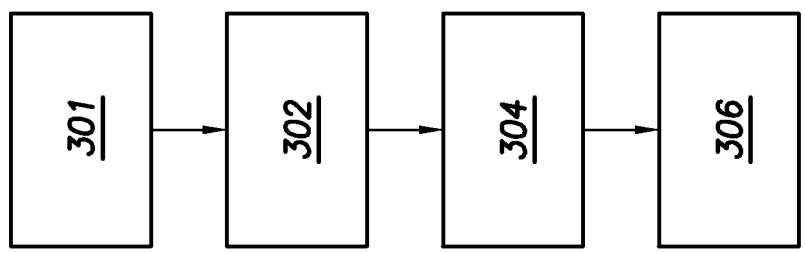
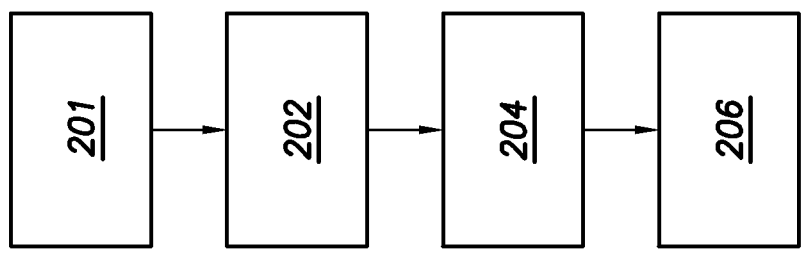

DRAG REDUCTION OF ASPHALTENIC CRUDE OILS

CROSS-REFERENCE TO RELATED APPLICATIONS

This application is a continuation-in-part application which claims the benefit of and priority to U.S. application Ser. No. 11/615,539 filed Dec. 22, 2006, entitled "Drag Reduction of Asphaltenic Crude Oils," and U.S. application Ser. No. 13/208,951, filed Aug. 12, 2011, entitled "Monomer Selection to Prepare Ultra High Molecular Weight Drag Reducer Polymer", which are hereby incorporated by reference in its entirety.

FIELD OF THE INVENTION

The present invention relates generally to high molecular weight drag reducers for use in crude oils. In another aspect, the present invention relates to high molecular weight drag reducing polymers for use in crude oils having an asphaltene content of at least about 3 weight percent and an API gravity of less than about 26°.

BACKGROUND

When fluids are transported by a pipeline, there is typically a drop in fluid pressure due to friction between the wall of the pipeline and the fluid. Due to this pressure drop, for a given pipeline, fluid must be transported with sufficient pressure to achieve the desired throughput. When higher flow rates are desired through the pipeline, more pressure must be applied due to the fact that, as flow rates are increased, the difference in pressure caused by the pressure drop also increases. However, design limitations on pipelines limit the amount of pressure that can be employed. The problems associated with pressure drop are most acute when fluids are transported over long distances. Such pressure drops can result in inefficiencies that increase equipment and operation costs.

To alleviate the problems associated with pressure drop, many in the industry utilize drag reducing additives in the flowing fluid. When the flow of fluid in a pipeline is turbulent, high molecular weight polymeric drag reducers can be employed to enhance the flow. A drag reducer is a composition capable of substantially reducing friction loss associated with the turbulent flow of a fluid through a pipeline. The role of these additives is to suppress the growth of turbulent eddies, which results in higher flow rate at a constant pumping pressure. Ultra-high molecular weight polymers are known to function well as drag reducers, particularly in hydrocarbon liquids. In general, drag reduction depends in part upon the molecular weight of the polymer additive and its ability to dissolve in the hydrocarbon under turbulent flow. Effective drag reducing polymers typically have molecular weights in excess of five million.

Conventional polymeric drag reducers, however, typically do not perform well in crude oils having a low API gravity and/or a high asphaltene content. Accordingly, there is a need for improved drag reducing agents capable of reducing the pressure drop associated with the turbulent flow of low API gravity and/or high-asphaltene crude oils through pipelines.

However not every monomer can be polymerized as drag reducing polymer. Even when monomers are selected that are known to have the ability to be polymerized as drag reducing polymers not all can be shown to impart drag reducing properties. There exists a need to find which polymers can impart drag reducing properties.

SUMMARY OF THE INVENTION

In one embodiment of the present invention, there is provided a method comprising: introducing a drag reducing polymer into a liquid hydrocarbon having an asphaltene content of at least about 3 weight percent and an API gravity of less than about 26° to thereby produce a treated liquid hydrocarbon. The drag reducing polymer comprises at least about 10,000 repeating units, and a plurality of the repeating units comprise a heteroatom.

In another embodiment of the present invention, there is provided a method comprising: introducing a drag reducing polymer into a liquid hydrocarbon having an asphaltene content of at least about 3 weight percent and an API gravity of less than about 26° to thereby produce a treated liquid hydrocarbon. The drag reducing polymer includes at least one repeating unit having at least one heteroatom, and the viscosity of the treated liquid hydrocarbon is not less than the viscosity of the liquid hydrocarbon prior to treatment with the drag reducing polymer.

In yet another embodiment of the present invention, there is provided a method for reducing pressure drop associated with the turbulent flow of heavy crude oil through a pipeline, wherein the heavy crude oil has an API gravity of less than about 26° and an asphaltene content of at least about 5 weight percent. The method of this embodiment comprises: (a) introducing a drag reducing polymer into the heavy crude oil, wherein the drag reducing polymer comprises at least about 25,000 repeating units; and (b) flowing the resulting treated crude oil through the pipeline, wherein the viscosity of the treated crude oil is not less than the viscosity of the heavy crude oil prior to treatment with the drag reducing polymer.

In still another embodiment of the present invention, there is provided a method comprising: introducing a drag reducing polymer into a liquid hydrocarbon having an asphaltene content of at least about 3 weight percent and an API gravity of less than about 26° to thereby produce a treated liquid hydrocarbon. The drag reducing polymer comprises at least about 10,000 repeating units and has a solubility parameter of at least about 17.

In still yet another embodiment of the present invention, there is provided a method comprising: introducing a drag reducing polymer into a liquid hydrocarbon having an asphaltene content of at least about 3 weight percent and an API gravity of less than about 26° to thereby produce a treated liquid hydrocarbon. The drag reducing polymer comprises at least about 10,000 repeating units and has a solubility parameter within at least about 20 percent of the solubility parameter of the liquid hydrocarbon.

The process begins by obtaining a first batch of monomers selected from a group of acrylates with a molecular weight equal to or less than butyl acrylate and/or methacrylate with a molecular weight equal to or less than butyl methacrylate. A second batch of monomers is then selected from a group of acrylates with a molecular weight greater than butyl acrylate and/or methacrylate with a molecular weight greater than butyl methacrylate. A mixture is then prepared by mixing the first batch of monomers and the second batch of monomers, wherein the second batch of monomers are greater than 50% by weight of the mixture. Finally, the mixture is polymerized to produce a drag reducing polymer. The drag reducing polymer is capable of imparting drag reducing properties in liquid hydrocarbons.

In yet another embodiment a process is taught of obtaining a first batch of monomers selected from a group of acrylates with side alkyl chains having four or less carbons and/or methacrylates with side alkyl chains having four or less. A second batch of monomers are selected from a group of acrylates with side alkyl chains having greater than four carbons and/or methacrylates with side alkyl chains greater than four carbons. A mixture is then prepared by mixing the first batch of monomers and the second batch of monomers, wherein the second batch of monomers are greater than 50% by weight of the mixture. Finally, the mixture is polymerized to produce a drag reducing polymer. The drag reducing polymer is capable of imparting drag reducing properties in liquid hydrocarbons.

In another embodiment a process is taught for selecting monomers to polymerize into an ultra high molecular weight polymer. In this embodiment a process is taught of first obtaining a first batch of monomers selected from a group of acrylates with side alkyl chains having four or less carbons and/or methacrylates with side alkyl chains having four or less. A second batch of monomers are selected from a group of acrylates with side alkyl chains having greater than four carbons and/or methacrylates with side alkyl chains greater than four carbons. A mixture is then prepared by mixing the first batch of monomers and the second batch of monomers, wherein the second batch of monomers are greater than 50% by weight of the mixture. Finally, the mixture is polymerized to produce a drag reducing polymer. The drag reducing polymer is capable of imparting drag reducing properties in liquid hydrocarbons.

BRIEF DESCRIPTION OF THE DRAWING FIGURES

A preferred embodiment of the present invention is described in detail below with reference to the attached drawing figures, wherein:

FIG. 1 is a normalized filament diameter vs. time plot depicting the normalized capillary breakup time for untreated San Joaquin Valley Heavy Crude Oil determined in accordance with the procedure described in Example 4;

FIG. 2 is a normalized filament diameter vs. time plot depicting the normalized capillary breakup time for San Joaquin Valley Heavy Crude Oil having 500 parts per million by weight (ppmw) of poly(2-ethylhexyl methacrylate) dissolved therein determined in accordance with the procedure described in Example 4; and FIG. 3 is a normalized filament diameter vs. time plot depicting the normalized capillary breakup time for San Joaquin Valley Heavy Crude Oil having 500 ppmw of a poly(l-decene) dissolved therein determined in accordance with the procedure described in Example 4.

FIG. 4 depicts a process of preparing an ultra high molecular weight polymer.

FIG. 5 depicts a process of preparing an ultra high molecular weight polymer.

DETAILED DESCRIPTION

Figure 1:
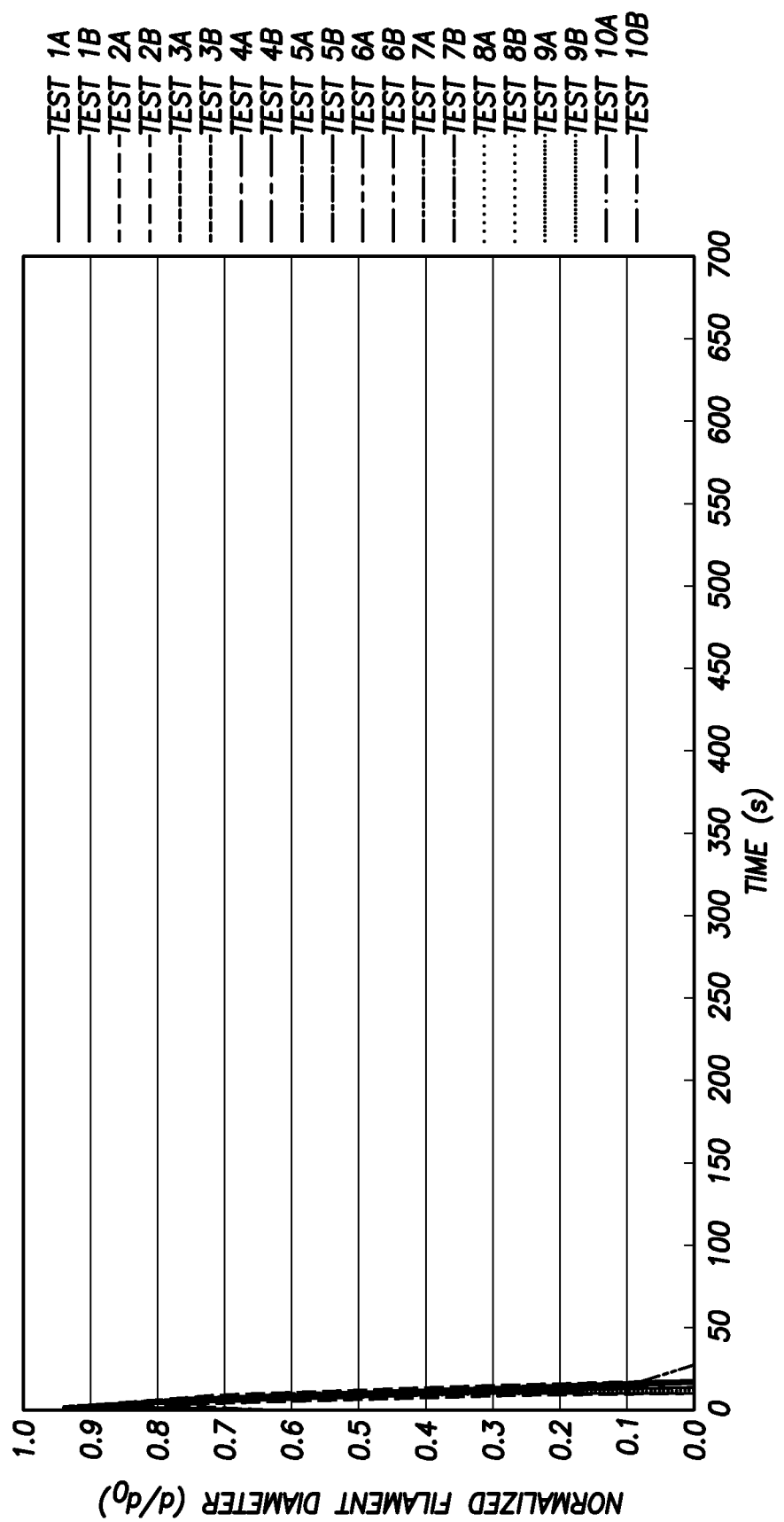

In accordance with one embodiment of the present invention, the pressure drop associated with flowing a liquid hydrocarbon through a conduit, such as a pipeline, can be reduced by treating the liquid hydrocarbon with a drag reducing polymer having at least one heteroatom. In one embodiment, the liquid hydrocarbon can be a heavy crude oil.

In one embodiment a process is taught of preparing a drag reducing polymer to impart maximum drag reduction properties. FIG. 4 is a flowchart depicting this process. Step 201 describes the first step in the process of obtaining a first batch of monomers selected from acrylates and/or methacrylates. The selection to use solely acrylates, solely methacrylates or a combination of acrylates and methacrylates depends upon different pricing models and different applications of the ultra high molecular weight polymer produced at the end. In this embodiment the acrylates can have a molecular weight equal to or less than butyl acrylate. Additionally, the methacrylates can have a molecular weight equal to or less than butyl methacrylate. Examples of acrylates or methacrylates that can be in the first batch include methyl acrylate, ethyl acrylate, propyl acrylates, butyl acrylates, methyl methacrylate, ethyl methacrylate, propyl methacrylates, butyl methacrylates and combinations and isomeric forms of these acrylates and methacrylates.

Step 202 describes the second step in the process wherein a second batch of monomers is selected from acrylates and/or methacrylates. In this embodiment the acrylates can have a molecular weight greater than butyl acrylate. Additionally, the methacrylates can have a molecular weight greater than butyl methacrylate. Examples of acrylates or methacrylates that can be in the second batch include pentyl acrylate, pentyl methacrylate, isopentyl acrylate, isopentyl methacrylate, hexyl acrylate, hexyl methacrylate, cyclohexyl acrylate, cyclohexyl methacrylate, heptyl acrylate, heptyl methacrylate, octyl acrylate, octyl methacrylate, isooctyl acrylate, isooctyl methacrylate, isodecyl acrylate, isodecyl methacrylate, lauryl acrylate, lauryl methacrylate, 2-ethylhexyl acrylate, 2-ethylhexyl methacrylate, benzyl acrylate, benzyl methacrylate, 2-phenylethyl acrylate, 2-phenylethyl methacrylate, tridecyl acrylate, tridecyl methacrylate, isobornyl acrylate, isobornyl methacrylate, 3,5,5-trimethylhexyl acrylate, 3,5,5-trimethylhexyl methacrylate, 3,3,5-trimethylcyclohexyl acrylate, 3,3,5-trimethylcyclohexyl methacrylate and combinations and isomeric forms of these acrylates and methacrylates.

A mixture can now be prepared 204 by mixing the first batch 201 with the second batch 202. In this mixture different quantities of second batch by weight can be used when compared to the total mixture by weight. In one embodiment the second batch is greater than 50% by weight of the mixture, in other embodiment the second batch can be 50%, 55%, 60%, 65%, 70%, 75%, 80%, 85%, 90%, 98%, 99%, or even 100% of the mixture is of the second batch.

Finally the mixture is polymerized to produce a drag reducing polymer 206.

In yet another embodiment a process is taught of preparing a drag reducing polymer to impart maximum drag reduction properties. FIG. 5 is a flowchart depicting this process. Step 301 describes the first step in the process of obtaining a first batch of monomers selected from acrylates and/or methacrylates. In this embodiment the acrylates can have a side alkyl chains having four or less carbons. Additionally the methacrylates can have side alkyl chains having four or less carbons.

Step 302 describes the second step in the process wherein a second batch of monomers is selected from acrylates and/or methacrylates. In this embodiment the acrylates can have a side alkyl chains having greater than four carbons. Additionally the methacrylates can have side alkyl chains having greater than four carbons. In yet another embodiment step 303 can also select the acrylates and methacrylates with side alkyl branching chains versus those with side alkyl straight chains.

A mixture can now be prepared 304 by mixing the first batch 301 with the second batch 302. In this mixture different quantities of second batch by weight can be used when compared to the total mixture by weight. In one embodiment the second batch is greater than 50% by weight of the mixture, in other embodiment the second batch can be 50%, 55%, 60%, 65%, 70%, 75%, 80%, 85%, 90%, 98%, 99%, or even 100% of the mixture is of the second batch.

Finally the mixture is polymerized to produce a drag reducing polymer 306.

In one embodiment of the present invention, the liquid hydrocarbon can comprise asphaltene compounds. As used herein, "asphaltenes" are defined as the fraction separated from crude oil or petroleum products upon addition of pentane, as described below in Example 3. While difficult to characterize, asphaltenes are generally thought to be high molecular weight, non-crystalline, polar compounds which exist in crude oil. In one embodiment of the present invention, the liquid hydrocarbon can comprise asphaltene compounds in an amount of at least about 3 weight percent, in the range of from about 4 to about 35 weight percent, or in the range of from 5 to 25 weight percent.

In another embodiment of the present invention, the liquid hydrocarbon can comprise heteroatoms. As used herein, the term "heteroatom" is defined as any atom that is not a carbon or hydrogen atom. Typically, heteroatoms include, but are not limited to, sulfur, nitrogen, oxygen, phosphorus, and chlorine atoms. In one embodiment, the liquid hydrocarbon can comprise sulfur in an amount of at least about 1 weight percent, in the range of from about 1 to about 10 weight percent, in the range of from about 1.2 to about 9 weight percent, or in the range of from 1.5 to 8 weight percent. Additionally, the liquid hydrocarbon can comprise nitrogen in an amount of at least about 1,300 parts per million by weight (ppmw), at least about 1,400 ppmw, or at least 1,500 ppmw.

In another embodiment of the present invention, the liquid hydrocarbon can comprise one or more metal components. In one embodiment, the liquid hydrocarbon can comprise metals in an amount of at least about 1 ppmw, in the range of from about 1 to about 2,000 ppmw, in the range of from about 50 to about 1,500 ppmw, or in the range of from 100 to 1,000 ppmw. Typical metals include, but are not limited to, nickel, vanadium, and iron. In one embodiment, the liquid hydrocarbon can comprise nickel in an amount of at least about 1 ppmw, in the range of from about 5 to about 500 ppmw, or in the range of from 10 to 250 ppmw. Additionally, the liquid hydrocarbon can comprise vanadium in an amount of at least about 1 ppmw, in the range of from about 5 to about 500 ppmw, or in the range of from 10 to 250 ppmw. Further, the liquid hydrocarbon can comprise iron in an amount of at least about 1 ppmw, in the range of from about 2 to about 250 ppmw, or in the range of from 5 to 100 ppmw.

In another embodiment of the present invention, the liquid hydrocarbon can comprise a residuum. As used herein, the term "residuum" is defined as the residual material remaining in the bottom of a fractionating tower after the distillation of crude oil as determined by ASTM test method D2892-05. In one embodiment, the liquid hydrocarbon can comprise at least about 10 weight percent, at least about 15 weight percent, or in the range of from 20 to 60 weight percent of a residuum having an initial boiling point of at least about 1,050° F.

In another embodiment, the liquid hydrocarbon can comprise conradson carbon. As used herein, the term "conradson carbon" is defined as the measured amount of carbon residue left after evaporation and pyrolysis of crude oil as determined by ASTM test method D189-05. In one embodiment, the liquid hydrocarbon can comprise conradson carbon in an amount of at least about 1 weight percent, in the range of from about 2 to about 50 weight percent, in the range of from about 3.5 to 45 weight percent, or in the range of from 5 to 40 weight percent.

In another embodiment of the present invention, the liquid hydrocarbon can have a low to intermediate API gravity. As used herein, the term "API gravity" is defined as the specific gravity scale developed by the American Petroleum Institute for measuring the relative density of various petroleum liquids. API gravity of a liquid hydrocarbon is determined according to the following formula:

$$\text{API gravity} = (141.5/SG \text{ at } 60°\text{ F.}) - 131.5$$

where SG is the specific gravity of the liquid hydrocarbon at 60° F. Additionally, API gravity can be determined according to ASTM test method D1298. In one embodiment, the liquid hydrocarbon can have an API gravity of less than about 26°, in the range of from about 5° to about 25°, or in the range of from 5° to 23°.

In another embodiment of the present invention, the liquid hydrocarbon can be a component of a fluid mixture that further comprises a non-hydrocarbon fluid and/or a non-liquid phase. In one embodiment, the non-hydrocarbon fluid can comprise water, and the non-liquid phase can comprise natural gas. Additionally, when the liquid hydrocarbon is a component of a fluid mixture, the liquid hydrocarbon can account for at least about 50 weight percent, at least about 60 weight percent, or at least 70 weight percent of the fluid mixture.

In another embodiment of the present invention, the liquid hydrocarbon can have a solubility parameter sufficient to allow at least partial dissolution of the above mentioned drag reducing polymer in the liquid hydrocarbon. The solubility parameter ($\delta_2$) of the liquid hydrocarbon can be determined according to the following equation:

$$\delta_2 = [(\Delta H_v - RT)/V]^{1/2}$$

where $\Delta H_v$ is the energy of vaporization, R is the universal gas constant, T is the temperature in Kelvin, and V is the molar volume. $\delta_2$ is given in units of $\text{MPa}^{1/2}$. The solubility parameter for the liquid hydrocarbon is determined in accord with the above equation and the description found on pages 465-467 of Strausz, O. & Lown, M., *The Chemistry of Alberta Oil Sands, Bitumens and Heavy Oils* (Alberta Energy Research Institute, 2003). In one embodiment, the liquid hydrocarbon can have a solubility parameter of at least about 17 $\text{MPa}^{1/2}$, or in the range of from about 17.1 to about 24 $\text{MPa}^{1/2}$, or in the range of from 17.5 to 23 $\text{MPa}^{1/2}$.

As mentioned above, the liquid hydrocarbon can be a heavy crude oil. Suitable examples of heavy crude oils include, but are not limited to, Merey heavy crude, Petrozuata heavy crude, Corocoro heavy crude, Albian heavy crude, Bow River heavy crude, Maya heavy crude, and San Joaquin Valley heavy crude. Additionally, the liquid hydrocarbon can be a blend of heavy crude oil with lighter hydrocarbons or diluents. Suitable examples of blended crude oils include, but are not limited to, Western Canadian Select and Marlim Blend.

As mentioned above, the liquid hydrocarbon can be treated with a drag reducing polymer. In one embodiment of the present invention, the drag reducing polymer can be in the form of a latex drag reducer comprising a high molecular weight polymer dispersed in an aqueous continuous phase.

The latex drag reducer can be prepared via emulsion polymerization of a reaction mixture comprising one or more monomers, a continuous phase, at least one surfactant, and an initiation system. The continuous phase generally comprises at least one component selected from the group consisting of water, polar organic liquids, and mixtures thereof. When water is the selected constituent of the continuous phase, the reaction mixture can also comprise a buffer. Additionally, as described in more detail below, the continuous phase can optionally comprise a hydrate inhibitor. In another embodiment, the drag reducing polymer can be in the form of a suspension or solution according to any method known in the art.

In one embodiment of the present invention, the drag reducing polymer can comprise a plurality of repeating units of the residues of one or more of the monomers selected from the group consisting of:

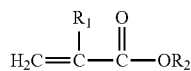
(A)

wherein $R_1$ is H or a C1-C10 alkyl radical, and $R_2$ is H, a C1-C30 alkyl radical, a C5-C30 substituted or unsubstituted cycloalkyl radical, a C6-C20 substituted or unsubstituted aryl radical, an aryl-substituted C1-C10 alkyl radical, a —(CH2CH2O)$_x$—$R_A$ or —(CH2CH(CH3)O)$_x$—$R_A$ radical wherein x is in the range of from 1 to 50 and $R_A$ is H, a C1-C30 alkyl radical, or a C6-C30 alkylaryl radical;

$$R_3\text{-arene-}R_4 \quad (B)$$

wherein arene is a phenyl, naphthyl, anthracenyl, or phenanthrenyl, $R_3$ is CH=CH$_2$ or CH$_3$—C=CH$_2$, and $R_4$ is H, a C1-C30 alkyl radical, a C5-C30 substituted or unsubstituted cycloalkyl radical, Cl, SO$_3$, OR$_B$, or COOR$_C$, wherein R$_B$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical, and wherein R$_C$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical;

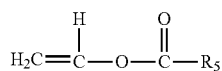
(C)

wherein $R_5$ is H, a C1-C30 alkyl radical, or a C6-C20 substituted or unsubstituted aryl radical;

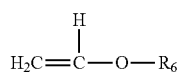
(D)

wherein $R_6$ is H, a C1-C30 alkyl radical, or a C6-C20 substituted or unsubstituted aryl radical;

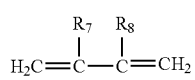
(E)

wherein $R_7$ is H or a C1-C18 alkyl radical, and $R_8$ is H, a C1-C18 alkyl radical, or Cl;

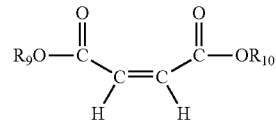
(F)

wherein $R_9$ and $R_{10}$ are independently H, a C1-C30 alkyl radical, a C6-C20 substituted or unsubstituted aryl radical, a C5-C30 substituted or unsubstituted cycloalkyl radical, or heterocyclic radicals;

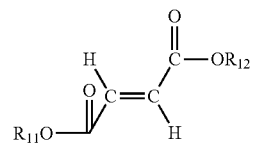
(G)

wherein $R_{11}$ and $R_{12}$ are independently H, a C1-C30 alkyl radical, a C6-C20 substituted or unsubstituted aryl radical, a C5-C30 substituted or unsubstituted cycloalkyl radical, or heterocyclic radicals;

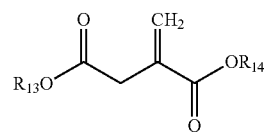
(H)

wherein $R_{13}$ and $R_{14}$ are independently H, a C1-C30 alkyl radical, a C6-C20 substituted or unsubstituted aryl radical, a C5-C30 substituted or unsubstituted cycloalkyl radical, or heterocyclic radicals;

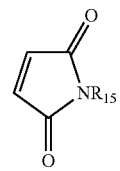
(I)

wherein $R_{15}$ is H, a C1-C30 alkyl radical, a C6-C20 substituted or unsubstituted aryl radical, a C5-C30 substituted or unsubstituted cycloalkyl radical, or heterocyclic radicals;

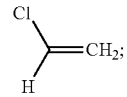
(J)

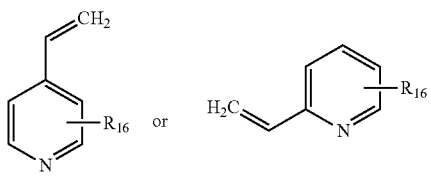 (K)

wherein $R_{16}$ is H, a C1-C30 alkyl radical, or a C6-C20 aryl radical;

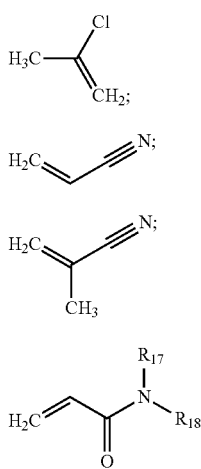

(L)

(M)

(N)

(O)

wherein $R_{17}$ and $R_{18}$ are independently H, a C1-C30 alkyl radical, a C6-C20 substituted or unsubstituted aryl radical, a C5-C30 substituted or unsubstituted cycloalkyl radical, or heterocyclic radicals;

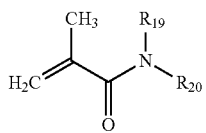 (P)

wherein $R_{19}$ and $R_{20}$ are independently H, a C1-C30 alkyl radical, a C6-C20 substituted or unsubstituted aryl radical, a C5-C30 substituted or unsubstituted cycloalkyl radical, or heterocyclic radicals.

In one embodiment of the present invention, the drag reducing polymer can comprise repeating units of the residues of C4-C20 alkyl, C6-C20 substituted or unsubstituted aryl, or aryl-substituted C1-C10 alkyl ester derivatives of methacrylic acid or acrylic acid. In another embodiment, the drag reducing polymer can be a copolymer comprising repeating units of the residues of 2-ethylhexyl methacrylate and the residues of at least one other monomer. In yet another embodiment, the drag reducing polymer can be a copolymer comprising repeating units of the residues of 2-ethylhexyl methacrylate monomers and butyl acrylate monomers. In still another embodiment, the drag reducing polymer can be a homopolymer comprising repeating units of the residues of 2-ethylhexyl methacrylate.

In one embodiment of the present invention, the drag reducing polymer can comprise the residues of at least one monomer having a heteroatom. As stated above, the term "heteroatom" includes any atom that is not a carbon or hydrogen atom. Specific examples of heteroatoms include, but are not limited to, oxygen, nitrogen, sulfur, phosphorous, and/or chlorine atoms. In one embodiment, the drag reducing polymer can comprise at least about 10 percent, at least about 25 percent, or at least 50 percent of the residues of monomers having at least one heteroatom. Additionally, the heteroatom can have a partial charge. As used herein, the term "partial charge" is defined as an electric charge, either positive or negative, having a value of less than 1.

The surfactant used in the above-mentioned reaction mixture can include at least one high HLB anionic or nonionic surfactant. The term "HLB number" refers to the hydrophile-lipophile balance of a surfactant in an emulsion. The HLB number is determined by the methods described by W. C. Griffin in J. Soc. Cosmet. Chem., 1, 311 (1949) and J. Soc. Cosmet. Chem., 5, 249 (1954), which are incorporated herein by reference. As used herein, the term "high HLB" shall denote an HLB number of 7 or more. The HLB number of surfactants for use with forming the reaction mixture can be at least about 8, at least about 10, or at least 12.

Exemplary high HLB anionic surfactants include, but are not limited to, high HLB alkyl sulfates, alkyl ether sulfates, dialkyl sulfosuccinates, alkyl phosphates, alkyl aryl sulfonates, and sarcosinates. Suitable examples of commercially available high HLB anionic surfactants include, but are not limited to, sodium lauryl sulfate (available as RHODAPON LSB from Rhodia Incorporated, Cranbury, N.J.), dioctyl sodium sulfosuccinate (available as AEROSOL OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX 40 from Norman, Fox & Co., Vernon, Calif.), and sodium lauroylsarcosinic (available as HAMPOSYL L-30 from Hampshire Chemical Corp., Lexington, Mass.).

Exemplary high HLB nonionic surfactants include, but are not limited to, high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Suitable examples of commercially available high HLB nonionic surfactants include, but are not limited to, nonylphenoxy and octylphenoxy poly (ethyleneoxy) ethanols (available as the IGEPAL CA and CO series, respectively from Rhodia, Cranbury, N.J.), C8 to C18 ethoxylated primary alcohols (such as RHODASURF LA-9 from Rhodia Inc., Cranbury, N.J.), C11 to C15 secondary-alcohol ethoxylates (available as the TERGITOL 15-S series, including 15-S-7, 15-S-9, 15-S-12, from Dow Chemical Company, Midland, Mich.), polyoxyethylene sorbitan fatty acid esters (available as the TWEEN series of surfactants from Uniquema, Wilmington, Del.), polyethylene oxide (25) oleyl ether (available as SIPONIC Y-500-70 from Americal Alcolac Chemical Co., Baltimore, Md.), alkylaryl polyether alcohols (available as the TRITON X series, including X-100, X-165, X-305, and X-405, from Dow Chemical Company, Midland, Mich.).

In one embodiment, the initiation system for use in the above-mentioned reaction mixture can be any suitable system for generating free radicals necessary to facilitate emulsion polymerization. Possible initiators include, but are not limited to, persulfates (e.g., ammonium persulfate, sodium persulfate, potassium persulfate), peroxy persulfates, and peroxides (e.g., tert-butyl hydroperoxide) used alone or in combination with one or more reducing components and/or accelerators. Possible reducing components include, but are not limited to, bisulfites, metabisulfites, ascorbic acid, and sodium formaldehyde sulfoxylate. Possible accelerators include, but are not limited to, any composition containing a transition metal having two oxidation states such as, for example, ferrous sulfate and ferrous ammonium sulfate. Alternatively, known thermal and radiation initiation techniques can be employed to generate the free radicals. In another embodiment, any polymerization and corresponding initiation or catalytic methods known by those skilled in the art may be used in the present invention. For example, when polymerization is performed by methods such as addition or condensation polymerization, the polymerization can be initiated or catalyzed by methods such as cationic, anionic, or coordination methods.

When water is used to form the above-mentioned reaction mixture, the water can be purified water such as distilled or deionized water. However, the continuous phase of the emulsion can also comprise polar organic liquids or aqueous solutions of polar organic liquids, such as those listed below.

As previously noted, the reaction mixture optionally can include a buffer. The buffer can comprise any known buffer that is compatible with the initiation system such as, for example, carbonate, phosphate, and/or borate buffers.

As previously noted, the reaction mixture optionally can include at least one hydrate inhibitor. The hydrate inhibitor can be a thermodynamic hydrate inhibitor such as, for example, an alcohol and/or a polyol. In one embodiment, the hydrate inhibitor can comprise one or more polyhydric alcohols and/or one or more ethers of polyhydric alcohols. Suitable polyhydric alcohols include, but are not limited to, monoethylene glycol, diethylene glycol, triethylene glycol, monopropylene glycol, and/or dipropylene glycol. Suitable ethers of polyhydric alcohols include, but are not limited to, ethylene glycol monomethyl ether, diethylene glycol monomethyl ether, propylene glycol monomethyl ether, and dipropylene glycol monomethyl ether.

Generally, the hydrate inhibitor can be any composition that when mixed with distilled water at a 1:1 weight ratio produces a hydrate inhibited liquid mixture having a gas hydrate formation temperature at 2,000 psia that is lower than the gas hydrate formation temperature of distilled water at 2,000 psia by an amount in the range of from about 10 to about 150° F., in the range of from about 20 to about 80° F., or in the range of from 30 to 60° F. For example, monoethylene glycol qualifies as a hydrate inhibitor because the gas hydrate formation temperature of distilled water at 2,000 psia is about 70° F., while the gas hydrate formation temperature of a 1:1 mixture of distilled water and monoethylene glycol at 2,000 psia is about 28° F. Thus, monoethylene glycol lowers the gas hydrate formation temperature of distilled water at 2,000 psia by about 42° F. when added to the distilled water at a 1:1 weight ratio. It should be noted that the gas hydrate formation temperature of a particular liquid may vary depending on the compositional make-up of the natural gas used to determine the gas hydrate formation temperature. Therefore, when gas hydrate formation temperature is used herein to define what constitutes a "hydrate inhibitor," such gas hydrate temperature is presumed to be determined using a natural gas composition containing 92 mole percent methane, 5 mole percent ethane, and 3 mole percent propane.

In forming the reaction mixture, the monomer, water, the at least one surfactant, and optionally the hydrate inhibitor, can be combined under a substantially oxygen-free atmosphere that is maintained at less than about 1,000 ppmw oxygen or less than about 100 ppmw oxygen. The oxygen-free atmosphere can be maintained by continuously purging the reaction vessel with an inert gas such as nitrogen and/or argon. The temperature of the system can be kept at a level from the freezing point of the continuous phase up to about 60° C., in the range of from about 0 to about 45° C., or in the range of from 0 to 30° C. The system pressure can be maintained in the range of from about 5 to about 100 psia, in the range of from about 10 to about 25 psia, or about atmospheric pressure. However, higher pressures up to about 300 psia can be necessary to polymerize certain monomers, such as diolefins.

Next, a buffer can be added, if required, followed by addition of the initiation system, either all at once or over time. The polymerization reaction is carried out for a sufficient amount of time to achieve at least about 90 percent conversion by weight of the monomers. Typically, this time period is in the range of from between about 1 to about 10 hours, or in the range of from 3 to 5 hours. During polymerization, the reaction mixture can be continuously agitated.

The following table sets forth approximate broad and narrow ranges for the amounts of the ingredients present in the reaction mixture.

| Ingredient | Broad Range | Narrow Range |
| --- | --- | --- |
| Monomer (wt. % of reaction mixture) | 10-60% | 30-50% |
| Water (wt. % of reaction mixture) | 20-80% | 50-70% |
| Surfactant (wt. % of reaction mixture) | 0.1-10% | 0.25-6% |
| Initiation system | | |
| Monomer: Initiator (molar ratio) | $1 \times 10^3:1 - 5 \times 10^6:1$ | $5 \times 10^3:1 - 2 \times 10^6:1$ |
| Monomer: Reducing Comp. (molar ratio) | $1 \times 10^3:1 - 5 \times 10^6:1$ | $1 \times 10^4:1 - 2 \times 10^6:1$ |
| Accelerator: Initiator (molar ratio) | $0.001:1 - 10:1$ | $0.005:1 - 1:1$ |
| Buffer | 0 to amount necessary to reach pH of initiation (initiator dependent, typically between about 6.5-10) | |
| Optional hydrate inhibitor | If present, the hydrate inhibitor can have a hydrate inhibitor-to-water weight ratio from about 1:10 to about 10:1, about 1:5 to about 5:1, or 2:3 to 3:2. | |

The emulsion polymerization reaction yields a latex composition comprising a dispersed phase of solid particles and a liquid continuous phase. The latex can be a stable colloidal dispersion comprising a dispersed phase of high molecular weight polymer particles and a continuous phase comprising water. The colloidal particles can comprise in the range of from about 10 to about 60 percent by weight of the latex, or in the range of from 40 to 50 percent by weight of the latex. The continuous phase can comprise water, the high HLB surfactant, the hydrate inhibitor (if present), and buffer as needed. Water can be present in the range of from about 20 to about 80 percent by weight of the latex, or in the range of from about 40 to about 60 percent by weight of the latex. The high HLB surfactant can comprise in the range of from about 0.1 to about 10 percent by weight of the latex, or in the range of from 0.25 to 6 percent by weight of the latex. As noted in the table above, the buffer can be present in an amount necessary to reach the pH required for initiation of the polymerization reaction and is initiator dependent. Typically, the pH required to initiate a reaction is in the range of from 6.5 to 10.

When a hydrate inhibitor is employed in the reaction mixture, it can be present in the resulting latex in an amount that yields a hydrate inhibitor-to-water weight ratio in the range of from about 1:10 to about 10:1, in the range of from about 1:5 to about 5:1, or in the range of from 2:3 to 3:2. Alternatively, all or part of the hydrate inhibitor can be added to the latex after polymerization to provide the desired amount of hydrate inhibitor in the continuous phase of the latex.

In one embodiment of the present invention, the drag reducing polymer of the dispersed phase of the latex can have a weight average molecular weight ($M_w$) of at least about $1 \times 10^6$ g/mol, at least about $2 \times 10^6$ g/mol, or at least $5 \times 10^6$ g/mol. The colloidal particles of drag reducing polymer can have a mean particle size of less than about 10 microns, less than about 1,000 nm (1 micron), in the range of from about 10 to about 500 nm, or in the range of from 50 to 250 nm. At least about 95 percent by weight of the colloidal particles can be larger than about 10 nm and smaller than about 500 nm. At least about 95 percent by weight of the particles can be larger than about 25 nm and smaller than about 250 nm. The continuous phase can have a pH in the range of from about 4 to about 10, or in the range of from about 6 to about 8, and contains few if any multi-valent cations.

In one embodiment of the present invention, the drag reducing polymer can comprise at least about 10,000, at least about 25,000, or at least 50,000 repeating units selected from the residues of the above mentioned monomers. In one embodiment, the drag reducing polymer can comprise less than 1 branched unit per each monomer residue repeating unit. Additionally, the drag reducing polymer can comprise less than 1 linking group per each monomer residue repeating unit. Furthermore, the drag reducing polymer can exhibit little or no branching or crosslinking. Also, the drag reducing polymer can comprise perfluoroalkyl groups in an amount in the range of from about 0 to about 1 percent based on the total number of monomer residue repeating units in the drag reducing polymer.

As mentioned above, a liquid hydrocarbon can be treated with the drag reducing polymer in order to reduce drag associated with flowing the liquid hydrocarbon through a conduit. In order for the drag reducing polymer to function as a drag reducer, the polymer should dissolve or be substantially solvated in the liquid hydrocarbon. Accordingly, in one embodiment of the present invention, the drag reducing polymer can have a solubility parameter that is within about 20 percent, about 18 percent, about 15 percent, or 10 percent of the solubility parameter of the liquid hydrocarbon, as discussed above.

The solubility parameter of the drag reducing polymer is determined according to the Van Krevelen method of the Hansen solubility parameters. This method of determining solubility parameters can be found on pages 677 and 683-686 of Brandrup et al., *Polymer Handbook* ($4^{th}$ ed., vol. 2, Wiley-Interscience, 1999), which is incorporated herein by reference. According to Brandrup et al., the following general equation was developed by Hansen and Skaarup to account for dispersive forces, polar interactions, permanent dipole-dipole interactions, and hydrogen bonding forces in determining solubility parameters:

$$\delta = (\delta_d^2 + \delta_p^2 + \delta_h^2)^{1/2}$$

where $\delta$ is the solubility parameter, $\delta_d$ is the term adjusting for dispersive forces, $\delta_p$ is the term adjusting for polar interactions, and $\delta_h$ is the term adjusting for hydrogen bonding and permanent dipole-induced dipole. Systems have been developed to estimate the above terms using a group contribution method, measuring the contribution to the overall solubility parameter by the various groups comprising the polymer. The following equations are used in determining the solubility parameter of a polymer according to the Van Krevelen method:

$$\delta_p = (\Sigma F_{pi}^2)^{1/2}/V$$

$$\delta_h = (\Sigma E_{hi}/V)^{1/2}$$

$$\delta_d = \Sigma F_{di}/V$$

The above equations and an explanation of how they are used can be found on pages 677 and 683-686 of Brandrup et al. The values for the variables F and E in the above equations are given in table 4, page 686 of Brandrup et al., based on the different residues comprising a polymer. For example, a methyl group (—$CH_3$) is given the following values: $F_{di}=420$ ($J^{1/2}$ $cm^{3/2}$/mol), $F_{pi}=0$ ($J^{1/2}$ $cm^{3/2}$/mol), $E_{hi}=0$ J/mol. Additionally, the values for the variable V in the above equations are given in Table 3 on page 685 where, for example, a methyl group (—$CH_3$) is given a value of V=33.5 ($cm^3$/mol). Using these values, the solubility parameter of a polymer can be calculated.

In one embodiment of the present invention, the drag reducing polymer can have a solubility parameter, as determined according to the above equations, of at least about 17 $MPa^{1/2}$, in the range of from about 17.1 to about 24 $MPa^{1/2}$, or in the range of from 17.5 to 23 $MPa^{1/2}$. Furthermore, the drag reducing polymer can have a solubility parameter that is within about 4 $MPa^{1/2}$, within about 3 $MPa^{1/2}$, or within 2.5 $MPa^{1/2}$ of the solubility parameter of the liquid hydrocarbon.

The drag reducing polymer can be added to the liquid hydrocarbon in an amount sufficient to yield a drag reducing polymer concentration in the range of from about 0.1 to about 500 ppmw, in the range of from about 0.5 to about 200 ppmw, in the range of from about 1 to about 100 ppmw, or in the range of from 2 to 50 ppmw. In one embodiment, at least about 50 weight percent, at least about 75 weight percent, or at least 95 weight percent of the solid drag reducing polymer particles can be dissolved by the liquid hydrocarbon. In another embodiment, the viscosity of the liquid hydrocarbon treated with the drag reducing polymer is not less than the viscosity of the liquid hydrocarbon prior to treatment with the drag reducing polymer.

The efficacy of the high molecular weight polymer particles as drag reducers when added directly to a liquid hydrocarbon is largely dependent upon the temperature of the liquid hydrocarbon. For example, at lower temperatures, the polymer dissolves at a lower rate in the liquid hydrocarbon, therefore, less drag reduction can be achieved. Thus, in one embodiment of the present invention, the liquid hydrocarbon can have a temperature at the time of treatment with the drag reducing polymer of at least about 30° C., or at least 40° C.

The drag reducers employed in the present invention can provide significant percent drag reduction. For example, the drag reducers can provide at least about 5 percent drag reduction, at least about 15 percent drag reduction, or at least 20 percent drag reduction. Percent drag reduction and the manner in which it is calculated are more fully described in Example 5, below.

EXAMPLES

The following examples are intended to be illustrative of the present invention in order to teach one of ordinary skill in the art to make and use the invention and are not intended to limit the scope of the invention in any way.

Example 1

Preparation of Polymer A and Polymer B

In this example, two formulations for the materials used in later examples are detailed. The resulting material in each procedure is a dispersion of drag reducing polymer in an aqueous carrier.

Preparation of Polymer A

Polymerization was performed in a 185-gallon stainless steel, jacketed reactor with a mechanical stirrer, thermocouple, feed ports, and nitrogen inlets/outlets. The reactor was charged with 440 lbs of monomer (2-ethylhexyl methacrylate), 558.1 lbs of de-ionized water, 41.4 lbs of Polystep B-5 (surfactant, available from Stepan Company of Northfield, Ill.), 44 lbs of Tergitol 15-S-7 (surfactant, available from Dow Chemical Company of Midland, Mich.), 1.86 lbs of potassium phosphate monobasic (pH buffer), 1.46 lbs of potassium phosphate dibasic (pH buffer), and 33.2 grams of ammonium persulfate, $(NH_4)_2S_2O_8$ (oxidizer).

The mixture was agitated at 110 rpm to emulsify the monomer in the water and surfactant carrier. The mixture was then purged with nitrogen to remove any traces of oxygen in the reactor and cooled to about 41° F. The agitation was slowed down to 80 rpm and the polymerization reaction was initiated by adding into the reactor 4.02 grams of ammonium iron(II) sulfate, $Fe(NH_4)_2(SO_4)_2 \cdot 6H_2O$ in a solution of 0.010 M sulfuric acid solution in DI water at a concentration of 558.3 ppm at a rate of 10 g/min. The solution was injected for 10 hours to complete the polymerization. The resulting latex was pressured out of the reactor through a 5-micron bag filter and stored. The solubility parameter of Polymer A was calculated to be 18.04 $MPa^{1/2}$.

Preparation of Polymer B

Preparation of Polymer B was performed in the same manner as the preparation of Polymer A above, with the following exception: the monomer charged to the reactor was an 80/20 weight percent blend of 2-ethylhexyl methacrylate and n-butyl acrylate. The solubility parameter of Polymer B was calculated to be 20.55 $MPa^{1/2}$.

Example 2

LP 100 and LP 300

LP 100 FLOW IMPROVER (LP 100) and LP 300 FLOW IMPROVER (LP 300) underwent various tests described below and were compared to the experimental drag reducers of the present invention, Polymer A and Polymer B, as described in Example 1. LP 100 and LP 300 are drag reducing agents comprising polyalphaolefins. Specifically, LP 100 comprises poly(1-decene) and LP 300 comprises a copolymer of poly(1-decene) and poly(1-tetradecene). Both LP 100 and LP 300 are commercially available from ConocoPhillips Specialty Products Inc. The solubility parameter of the polymer in LP 100 was calculated to be 16.49 $MPa^{1/2}$, and the solubility parameter of the polymer in LP 300 was calculated to be 16.54 $MPa^{1/2}$.

Example 3

Asphaltene Content and Elasticity Response (Affinity)

Crude oils ranging in classification from heavy crudes to light crudes were first tested to determine their respective concentrations of asphaltene and their API gravities. These same crude oil samples were also tested to determine their affinity for drag reducing agents as prepared in Examples 1 and 2. The results are listed in Table 1 below.

Asphaltene concentration was determined using pentane precipitation and filtration. For each measurement listed in Table 1, a 40-fold volume of pentane was added to approximately 16 grams of crude oil sample. The mixtures were agitated via rolling for an overnight period, and allowed to set for approximately 24 hours. The mixtures were then filtered through a 0.8 micrometer filter to retain the asphaltene. The asphaltenes retained were then weighed, and the weight percent was calculated based upon the original crude oil sample weight. API gravity was determined in accord with ASTM test method D1298.

The crude oil's affinity for drag reducing agents was determined by assessing each crude oil's elasticity after being treated with a drag reducing agent. Four samples of each variety of crude oil were dosed at room temperature with 5 weight percent of Polymer A, Polymer B, LP 100, and LP 300 respectively. The samples were allowed to roll overnight to insure full dissolution of the drag reducing agent into the samples. After rolling, the samples were visually inspected for their elastic response by inserting a hooked-end spatula into the sample and pulling the spatula away from the bulk of the sample. Some samples yielded a high response, meaning that a highly elastic "string" or "rope" of crude oil could be pulled from the sample. Conversely, some samples yielded no response, meaning that the crude oil merely dripped from the spatula.

TABLE 1

| Asphaltene Content, API Gravity, and Elasticity Response | | | | | | | |
|---|---|---|---|---|---|---|---|
| | | ASPHALTENE CONTENT | | API | ELASTICITY RESPONSE (AFFINITY) | | |
| Crude Oil Sample | Type | Test 1 | Test 2 | Gravity | LP 100 | LP 300 | Polymer A | Polymer B |
| Merey | Heavy | 16.8 | 15.5 | 16.0° | None | None | High | High |
| Petrozuata | Heavy | 18.8 | 18.1 | 9.1° | None | None | High | High |
| Corocoro | Heavy | 6.0 | 6.7 | 25.1° | None | None | High | High |
| Albian | Heavy | 11.0 | 10.6 | 22.4° | None | None | High | High |
| Bow River | Heavy | 11.4 | 10.3 | 21.8° | None | None | High | High |
| Maya | Heavy | 14.6 | 15.4 | 21.9° | None | None | High | High |
| Western Canadian Select | Heavy | 11.5 | 11.9 | 20.9° | None | None | High | High |
| San Joaquin Valley | Heavy | 8.9 | 8.9 | 13.0° | None | None | High | High |
| Marlim Blend | Heavy | 6.7 | 6.6 | 22.2° | High | High | High | High |
| West Texas Sour | Intermediate | 2.8 | 2.8 | 31.6° | High | High | Moderate | Moderate |
| West Texas Intermediate | Light | 0.5 | — | 41.6° | High | High | Moderate | Moderate |
| Basrah | Light | 4.8 | — | 31.0° | High | High | Moderate | Moderate |

The results in Table 1 tend to show that crude oils having a higher asphaltene content and/or lower API gravity have a higher affinity for Polymers A and B than for LP 100 and 300. Evidence of stronger affinity (i.e., increased elasticity) is generally an indication of a higher potential for performance as a drag reducing agent.

Example 4

Extensional Rheometry

The extensional viscosity (or extensional behavior) of a fluid treated with a drag reducing polymer is directly related to the polymer's potential for reducing turbulent drag in the fluid. If increased extensional behavior is observed in the fluid upon addition of the drag reducing polymer, this is indicative of increased potential for drag reduction performance. Conversely, if no extensional behavior is observed, the potential for drag reduction performance in that fluid is unlikely. The extensional behavior of a treated fluid can be determined by capillary breakup extensional rheometry testing, performed on a HAAKE CaBER 1, available from Thermo Electron Corp., Newington, N.H., U.S.A.

The HAAKE CaBER 1 is operated by placing a small quantity of sample (less than 0.1 ml) between top and bottom circular plates using a 16 gauge, 1-inch long syringe needle. The top plate is rapidly separated upwardly from the bottom plate at a user-selected strain rate, thereby forming an unstable fluid filament by imposing an instantaneous level of extensional strain on the fluid sample. After cessation of stretching, the fluid at the mid-point of the filament undergoes an extensional strain rate defined by the extensional properties of the fluid. A laser micrometer monitors the midpoint diameter of the gradually thinning fluid filament as a function of time. The competing effects of surface tension, viscosity, mass transfer and elasticity can be quantified using model fitting analysis software.

Figure 2:
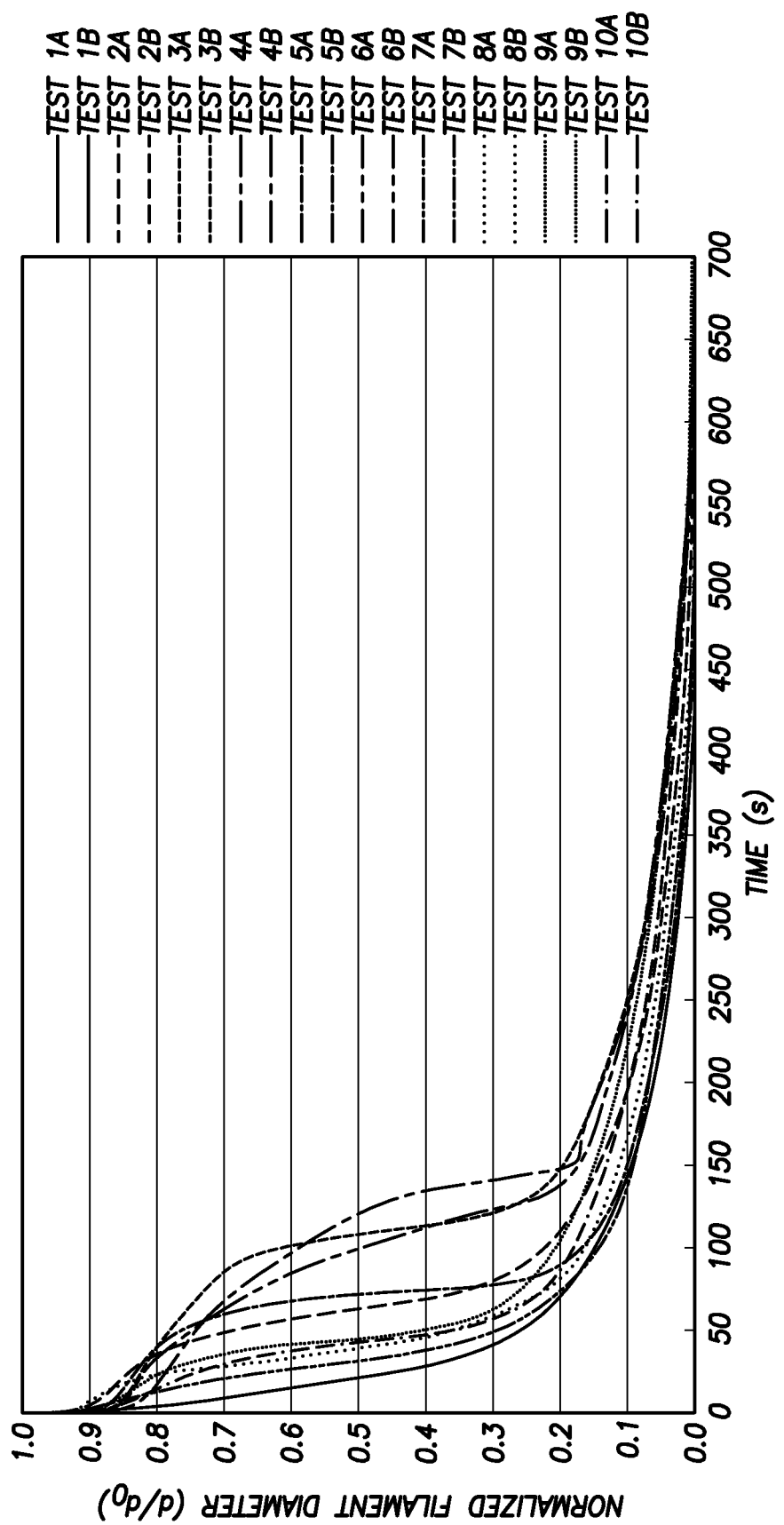
Figure 3:
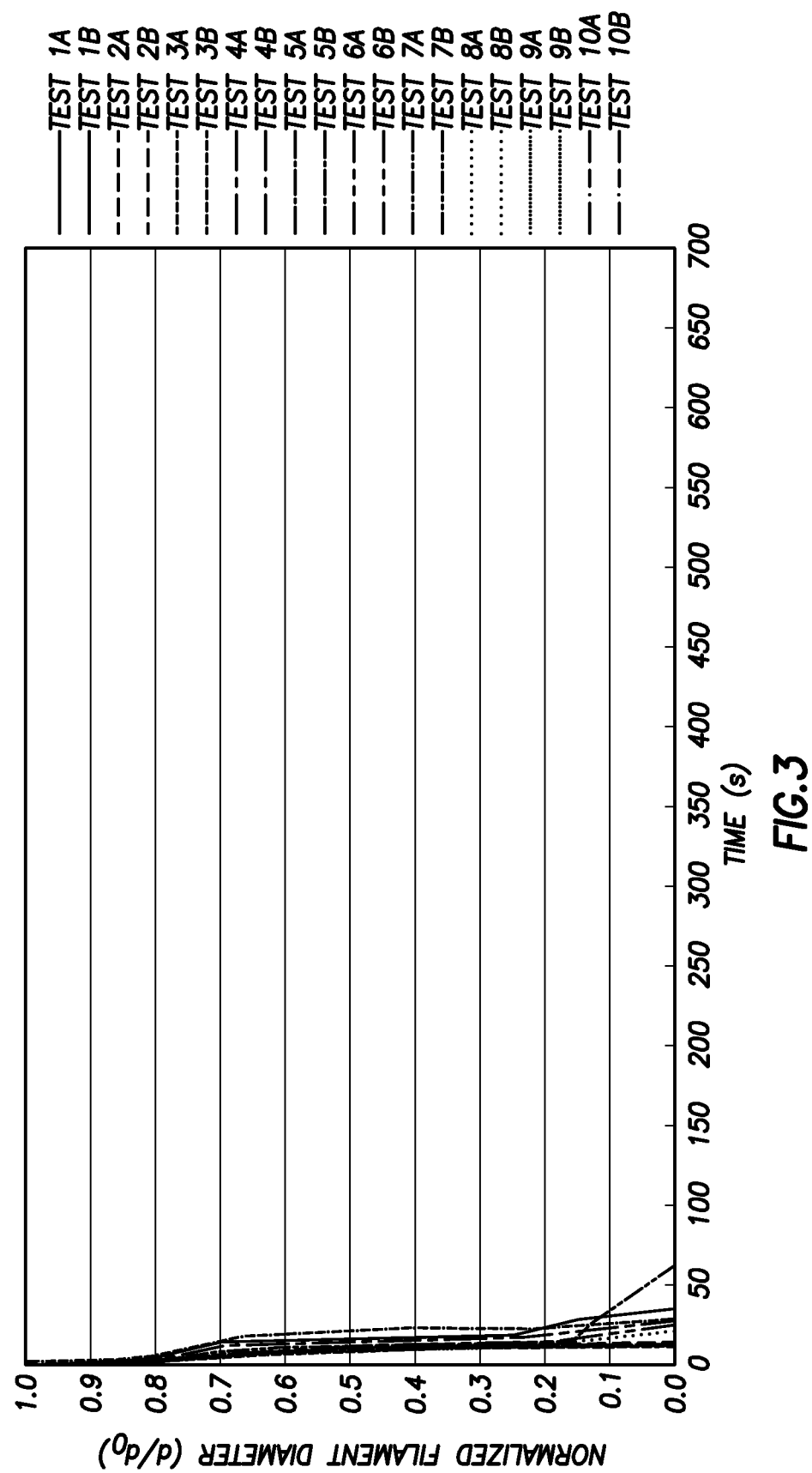

In this example, three samples were prepared and tested for extensional rheometry using a HAAKE CaBER 1. The first sample was untreated (neat) San Juaquin Valley Heavy (SJVH) crude oil. The second sample was SJVH crude containing 500 ppmw of the active polymer found in Polymer A (poly(2-ethylhexyl methacrylate)) as prepared in Example 1, and the third sample was SJVH crude containing 500 ppmw of the active polymer found in LP 100 (poly(l-decene)) as described in example 2. According to the procedure described above, less than 0.1 ml of each of these three samples was placed between the two plates of the CaBER 1, and the plates were separated quickly while measuring the diameter of the resultant filament. For each test, the default instrument settings were employed, and a Hencky strain of c=0.70 was used. Hencky strain is defined as:

$$\varepsilon = \ln\left(\frac{L}{L_0}\right)$$

where $$\frac{L}{L_0}$$

is the relative extension of the fluid. The diameter of the resultant filament was measured against time. Each sample in the above described procedure was tested 10 times to obtain statistical confidence in the data. The results from these tests are shown in FIGS. 1 through 3. Additionally, each test was performed at a room temperature of about 25° C.

In each of FIGS. 1, 2, and 3, the filament diameter was normalized, such that a filament diameter of $d/d_0$ is shown, where $d_0$ is the filament diameter at time zero (0 seconds) and d is the filament diameter at any given time thereafter. The results from these tests show that the extensional behavior of the untreated SJVH crude oil and SJVH crude oil containing 500 ppmw the active polymer found in LP 100 (poly(1-decene)) are very similar (shown in FIGS. 1 and 3, respectively), indicating that LP 100 does not have any noticeable potential for reducing drag of heavy crude oil in a pipeline. However, SJVH having 500 ppmw of the active polymer found in Polymer A (poly(2-ethylhexyl methacrylate)) shows a significant increase in extensional rheometry, as shown in FIG. 2. This increase in extensional rheometry indicates an increased potential for Polymer A to reduce drag of heavy crude oil in a pipeline.

Example 5

Pipeline Testing

Pipeline field testing was performed with various diameter pipelines, and various crude oils, comparing the performance of Polymers A and B, as prepared in Example 1, with LP 100 and LP 300, as described in Example 2. The following three tests were performed, followed by their respective results in tables 2, 3, and 4. For each of the three tests described below, the percent drag reduction (% DR) was determined by measuring the pressure drop in the segment of pipe being tested prior to addition of drag reducing agent ($\Delta P_{base}$) 1 and base, measuring the pressure drop in the segment of pipe being tested after addition of drag reducing agent ($\Delta P_{treated}$). The percent drag reduction was then determined according to the following formula:

$$\% \, DR = ((\Delta P_{base} - \Delta P_{treated})/\Delta P_{base}) \Delta 100\%$$

Test 1

Test 1 was conducted in a 12-inch diameter crude oil pipeline carrying West Texas Intermediate (WTI) crude oil. This crude oil is a light crude, generally having an API gravity of about 40°. WTI generally has a viscosity of approximately 4.5 centistokes at pipeline temperatures of 65 to 69° F. The pipeline tests in Test 1 were conducted in a 62-mile segment of the pipeline running from Wichita Falls, Tx., to Bray, Okla. The nominal flow rate of the pipeline during the field tests was 2,350 barrels/hr, and the nominal flow velocity in the pipeline was 4.5 ft/s. The following drag reduction performance was achieved:

TABLE 2

LP 100 v. Polymer A & Polymer B in Light Crude (WTI)

| PRODUCT | CONCEN-TRATION (ppmw) | DRAG REDUCTION (%) |
|---|---|---|
| LP 100 | 4.7 | 33.8 |
| LP 100 | 23.5 | 67.2 |
| Polymer A | 40.4 | 24.4 |
| Polymer A | 80.1 | 36.3 |
| Polymer B | 40.2 | 31.3 |
| Polymer B | 81.0 | 40.4 |
| Polymer B | 150.4 | 45.7 |

Test 2

Test 2 was conducted in an 18-inch diameter crude oil pipeline carrying Albian Heavy Sour (AHS) crude oil blend. This crude oil blend is a heavy crude oil, generally having an API gravity of about 22°. AHS generally has a viscosity of approximately 84 centistokes at a pipeline temperature of 71° F. The pipeline tests in Test 2 were conducted in a 54-mile segment of the pipeline running from Cushing, Okla., to Marland, Okla. The nominal flow velocity in the pipeline was 4.8 ft/s. The nominal calculated Reynolds number for the pipeline was 7,500. The following drag reduction performance was achieved:

TABLE 3

LP 100 v. Polymer B in Heavy Crude (AHS)

| PRODUCT | CONCEN-TRATION (ppmw) | DRAG REDUCTION (%) |
|---|---|---|
| LP 100 | 41.6 | 0 |
| Polymer B | 25.2 | 23.1 |
| Polymer B | 100.0 | 42.5 |

Test 3

Test 3 was conducted in an 8-inch diameter crude oil pipeline carrying San Joaquin Valley Heavy (SJVH) crude oil blend. This crude oil blend is a heavy crude oil, generally having an API gravity of about 13°. SJVH generally has a viscosity of approximately 100 centistokes at a pipeline temperature of 165° F. The pipeline tests in Test 3 were conducted in a 14-mile segment of the pipeline running from the Middlewater pump station to the Junction pump station, both in California. The nominal flow rate of the pipeline during Test 3 was 1,300 barrels/hr, and the nominal flow velocity in the pipeline was 5.6 ft/s. The nominal calculated Reynolds number for the pipeline was 4,000. The following drag reduction performance was achieved:

TABLE 4

LP 300 v. Polymer A & Polymer B in Heavy Crude (SJVH)

| PRODUCT | CONCEN-TRATION (ppmw) | DRAG REDUCTION (%) |
|---|---|---|
| LP 300 | 187.0 | 0 |
| Polymer A | 50.0 | 28.5 |
| Polymer A | 100.0 | 39.5 |
| Polymer B | 50.0 | 28.8 |
| Polymer B | 100 | 36.7 |

Comparing the above three tests, the results listed in Table 2 tend to show that the drag reduction achieved by addition of LP 100 product in light crude oil yields slightly more favorable results than either of the EXP products. However, when heavy crude oils are used, as shown in Tables 3 and 4, the use of Polymers A or B results in higher percentages of drag reduction than either of the LP products.

Example 7

Alkyl Acrylates

The following monomers were emulsion polymerized and tested for their drag reducing properties:

| Alkyl Acrylate | Carbon Number | Alkyl Chain | Inherent Viscosity | % Drag Reduction in Diesel at 2 ppm | WCS Oil Affinity | WTI Oil Affinity |
|---|---|---|---|---|---|---|
| n-Butyl Acrylate | 4 | Straight | 14.2 | 0 | 0 | 0 |
| tert-Butyl Acrylate | 4 | Branched | 18.5 | 0 | 1.0 | 0 |
| 2-ethylhexyl Acrylate | 8 | Branched | 11.5 | 12.9 | 4.5 | 1.5 |

As it is shown in the above mentioned example acrylates with alkyl chains larger than 4 provided the greatest amount of drag reduction.

Example 8

Alkyl Methacrylates

The following polymers were emulsion polymerized and tested for their drag reducing properties:

| Alkyl Methacrylate | Carbon Number | Alkyl Chain | Inherent Viscosity | % Drag Reduction in Diesel at 2 ppm | WCS Oil Affin0ity | WTI Oil Affinity |
|---|---|---|---|---|---|---|
| Methyl Methacrylate | 1 | Straight | 14.4 | 0 | 0 | 0 |
| n-Butyl Methacrylate | 4 | Straight | 12.7 | 0 | 1.0 | 0 |
| iso-Butyl Methacrylate | 4 | Branched | 18.7 | 0 | 1.0 | 0 |
| Hexyl Methacrylate | 6 | Straight | 19.5 | 31.9 | 6.5 | 2.0 |
| 2-Ethylhexyl Methacrylate | 8 | Branched | 18.6 | 36.8 | 7.0 | 1.5 |
| Isodecyl Methacrylate | 10 | Branched | 14.3 | 24.8 | 9.5 | 2.0 |
| Lauryl Methacrylate | 12 | Straight | 12.6 | 17.2 | 9.0 | 3.0 |

As it is shown in the above mentioned example acrylates with alkyl chains larger than 4 provided the greatest amount of drag reduction.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.+/−37° F.), an intermediate numerical range of 43° F. to 81° F. (62° F.+/−19° F.), and a narrow numerical range of 53° F. to 71° F. (62° F.+/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

DEFINITIONS

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process comprising:
    a) obtaining a first batch of a first monomer comprising 2-ethylhexyl methacrylate;
    b) obtaining a second batch of a second monomer;
    c) preparing a mixture comprising the first monomer and the second monomer; and
    d) polymerizing the mixture via emulsion polymerization to produce a latex drag reducing polymer comprising a copolymer that includes at least 25,000 repeating units, and e) adding the latex drag reducing polymer to a heavy crude oil; wherein the latex drag reducing polymer has a weight average molecular weight of at least 5 million g/mol, the latex drag reducing polymer providing at least a 20 percent drag reduction in heavy crude oil as it flows through a pipeline during use, the heavy crude oil comprising an asphaltene content of at least 3 weight percent and an API gravity of less than about 26°.

2. The process of claim 1, wherein the second monomer is n-butyl acrylate.

3. The process of claim 1, wherein the mixture is an 80/20 weight percent blend of 2-ethylhexyl methacrylate monomer (80 percent) and n-butyl acrylate monomer (20 percent).

4. The process of claim 1, wherein the mixture comprises between 68 and 92 weight percent of 2-ethylhexyl methacrylate monomer.

5. The process of claim 1, wherein second monomer has the following chemical structure:

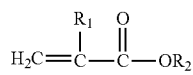

wherein $R_1$ is selected from the group consisting of (a) H and (b) a C1-C10 alkyl radical; and wherein $R_2$ is selected from the group consisting of (a) H, (b) a C1-C30 alkyl radical, (c) a C5-C30 substituted or unsubstituted cycloalkyl radical, (d) a C6-C20 substituted or unsubstituted aryl radical, (e) an aryl-substituted C1-C10 alkyl radical, and (f) a —(CH2CH2O)$_x$—$R_A$ or —(CH2CH(CH3)O)$_x$—$R_A$ radical, wherein x is in the range of from 1 to 50 and $R_A$ is selected from the group consisting of (i) H, (ii) a C1-C30 alkyl radical, and (iii) a C6-C30 alkylaryl radical.

6. The process of claim 1, wherein the latex drag reducing polymer provides at least 36.7 percent drag reduction in the heavy crude oil as it flows through a pipeline during use.

7. The process of claim 1, wherein the latex drag reducing polymer provides at least 42.5 percent drag reduction in the heavy crude oil as it flows through a pipeline during use.

8. The process of claim 1, wherein the copolymer comprises at least 50,000 repeating units.

9. The process of claim 1, wherein the second monomer comprises a heteroatom.

10. The process of claim 1, wherein the latex drag reducing polymer has little or no crosslinking.

11. The process of claim 1, the drag reducing polymer being added to the heavy crude oil in an amount between about 0.1 ppmw and about 500 ppmw without causing a decrease in viscosity of the heavy crude oil, and wherein the drag reducing polymer reduces friction loss associated with the turbulent flow of the heavy crude oil through the pipeline.

12. The process of claim 11, wherein the heavy crude oil has an asphaltene content of at least about 5 weight percent and the API gravity of the heavy crude oil is in the range of from 5° to 23°.

13. The process of claim 11, wherein the asphaltene content of the heavy crude oil is in the range of from 4 to about 35 weight percent and the API gravity of the heavy crude oil is in the range of from 5° to 23°.

14. The process of claim 1, wherein the latex drag reducing polymer has a solubility parameter within about 10 percent of a solubility parameter of the heavy crude oil.

15. A process comprising:
a) obtaining a first batch of a first monomer comprising 2-ethylhexyl methacrylate;
b) obtaining a second batch of a second monomer;
c) preparing a mixture comprising the first monomer and the second monomer;
d) polymerizing the mixture via emulsion polymerization to produce a latex drag reducing polymer comprising a copolymer that includes at least 25,000 repeating units; and
e) testing the latex drag reducing polymer by adding it to a heavy crude oil to assess the heavy crude oil's affinity for the latex drag reducing polymer;
wherein the latex drag reducing polymer has a weight average molecular weight of at least 5 million g/mol, the latex drag reducing polymer providing at least a 20 percent drag reduction in heavy crude oil as it flows through a pipeline during use, the heavy crude oil comprising an asphaltene content of at least 3 weight percent and an API gravity of less than about 26°.

16. A process comprising:
a) obtaining a first batch of a monomer comprising 2-ethylhexyl methacrylate;
b) preparing a reaction mixture comprising the monomer, at least one surfactant, and an initiation system; and
d) polymerizing the mixture via emulsion polymerization to produce a latex drag reducing polymer that includes at least 25,000 repeating units, wherein the latex drag reducing polymer has a weight average molecular weight of at least 5 million g/mol;
e) adding the latex drag reducing polymer to a heavy crude oil having an asphaltene content of at least 3 weight percent and an API gravity of less than about 26° in a pipeline, the drag reducing polymer being added to the heavy crude oil in an amount between about 0.1 ppmw and about 500 ppmw without causing a decrease in viscosity of the heavy crude oil, and wherein the drag reducing polymer reduces friction loss associated with the turbulent flow of the heavy crude oil through the pipeline to provide at least 20 percent drag reduction.

17. A process comprising:
(a) obtaining a drag reducing polymer formed from 2-ethylhexyl methacrylate, the drag reducing polymer having been formed via emulsion polymerization of a reaction mixture comprising 2-ethylhexyl methacrylate monomer, at least one surfactant, and an initiation system, wherein the drag reducing polymer comprises at least 25,000 repeating units and has a weight average molecular weight of at least 5 million g/mol;
(b) adding the drag reducing polymer into a pipeline containing a liquid hydrocarbon having an asphaltene content of at least 3 weight percent and an API gravity of less than about 26°, the drag reducing polymer being added in an amount between about 0.1 ppmw and about 500 ppmw without causing a decrease in viscosity of the liquid hydrocarbon, and wherein the drag reducing polymer provides at least 20 percent drag reduction in the liquid hydrocarbon as it flows through the pipeline.

18. The process of claim 17, wherein the liquid hydrocarbon has an asphaltene content of at least 5 weight percent and an API gravity in the range of from 5° to 23°.

19. The process of claim 17, wherein the drag reducing polymer is a homopolymer of 2-ethylhexyl methacrylate that comprises at least 50,000 repeating units.

20. The process of claim 17, wherein the drag reducing polymer has a solubility parameter within 2.5 MPa$^{1/2}$ of a solubility parameter of the liquid hydrocarbon.

21. The process of claim 17, wherein the drag reducing polymer provides at least 36.7 percent drag reduction in the liquid hydrocarbon as it flows through the pipeline.

22. The process of claim 17, wherein the drag reducing polymer provides at least 42.5 percent drag reduction in the liquid hydrocarbon as it flows through the pipeline.

23. A process comprising:
(a) obtaining a drag reducing polymer formed from one or more monomers having the following chemical structure:

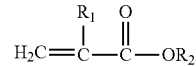

wherein $R_1$ is selected from the group consisting of (a) H and (b) a C1-C10 alkyl radical; and wherein $R_2$ is a C1-C30 alkyl radical, the drag reducing polymer having been formed via emulsion polymerization of a reaction mixture comprising the one or more monomers, at least one surfactant, and an initiation system, wherein the drag reducing polymer comprises at least 25,000 repeating units and has a weight average molecular weight of at least 5 million g/mol;

(b) adding the drag reducing polymer into a pipeline containing a liquid hydrocarbon having an asphaltene content of at least 5 weight percent and API gravity in the range of from 5° to 23°, the drag reducing polymer being added in an amount between about 0.1 ppmw and about 500 ppmw without causing a decrease in viscosity of the liquid hydrocarbon, and wherein the drag reducing polymer provides at least 20 percent drag reduction in the liquid hydrocarbon as it flows through the pipeline.

* * * * *